United States Patent [19]
Mikami

[11] Patent Number: 5,629,771
[45] Date of Patent: May 13, 1997

[54] RECORDING APPARATUS FEATURING RECORDING ELEMENTS DISPOSED IN A LINE WHEREIN THE LINE IS SLANTED RELATIVE TO A SUBSCANNING DIRECTION AND A METHOD OF USING SAME

[75] Inventor: Fumio Mikami, Chigasaki, Japan

[73] Assignee: Canon Kabushiki Kaisha, Tokyo, Japan

[21] Appl. No.: 153,037

[22] Filed: Nov. 17, 1993

[30]    Foreign Application Priority Data

Nov. 19, 1992 [JP] Japan .................................. 4-309888

[51] Int. Cl.⁶ .................. H04N 1/04; H04N 1/34; B41J 29/38; B41J 2/145
[52] U.S. Cl. ................. 358/296; 358/474; 347/3; 347/12; 347/40
[58] Field of Search ................. 358/296, 298, 358/457, 471, 472, 474, 482, 483, 486, 488, 494, 497, 507, 502, 505, 513, 514; 347/3–5, 9, 10, 12–14, 40–42, 56; 395/101, 104, 106, 108, 109, 111, 112

[56]    References Cited

U.S. PATENT DOCUMENTS

| | | | |
|---|---|---|---|
| 4,345,262 | 8/1982 | Shirato et al. | 346/140 R |
| 4,418,356 | 11/1983 | Reece | 346/140 R |
| 4,459,600 | 7/1984 | Sato et al. | 346/140 R |
| 4,463,359 | 7/1984 | Ayata et al. | 346/1.1 |
| 4,558,333 | 12/1985 | Sugitani et al. | 346/140 R |
| 4,613,124 | 9/1986 | Lohrmann et al. | 271/16 |
| 4,723,129 | 2/1988 | Endo et al. | 346/1.1 |
| 4,739,415 | 4/1988 | Toyono et al. | 358/296 |
| 4,740,796 | 4/1988 | Endo et al. | 346/1.1 |
| 4,812,859 | 3/1989 | Chan et al. | 346/140 R |
| 4,905,040 | 2/1990 | Nagai et al. | 355/43 |
| 5,155,499 | 10/1992 | Goetz et al. | 346/1.1 |
| 5,181,104 | 1/1993 | Sugishima et al. | 358/474 X |
| 5,258,774 | 11/1993 | Rogers | 346/1.1 |
| 5,373,368 | 12/1994 | Taniguro | 358/296 |
| 5,432,617 | 7/1995 | Sugishima | 358/296 X |

FOREIGN PATENT DOCUMENTS

| | | | |
|---|---|---|---|
| 54-056847 | 5/1979 | Japan | B41M 5/26 |
| 59-123670 | 7/1984 | Japan | B41J 3/04 |
| 59-138461 | 8/1984 | Japan | B41J 3/04 |
| 60-071260 | 4/1985 | Japan | B41J 3/04 |

*Primary Examiner*—Eric Frahm
*Attorney, Agent, or Firm*—Fitzpatrick, Cella, Harper & Scinto

[57]    ABSTRACT

A copying machine in which an image scanner reciprocates along a main-scanning direction to read an original image, and a recording head of a printer also reciprocates along the main-scanning direction to record an image. To avoid slanting the recorded image by the reciprocating motion of the recording head, and to achieve high-speed printing, nozzles of the recording head are aligned in a line slanted with respect to a subscanning direction. Thus, image data read by the image scanner is real-time converted to a recording signal and supplied as a nozzle driving signal to the recording head.

21 Claims, 19 Drawing Sheets

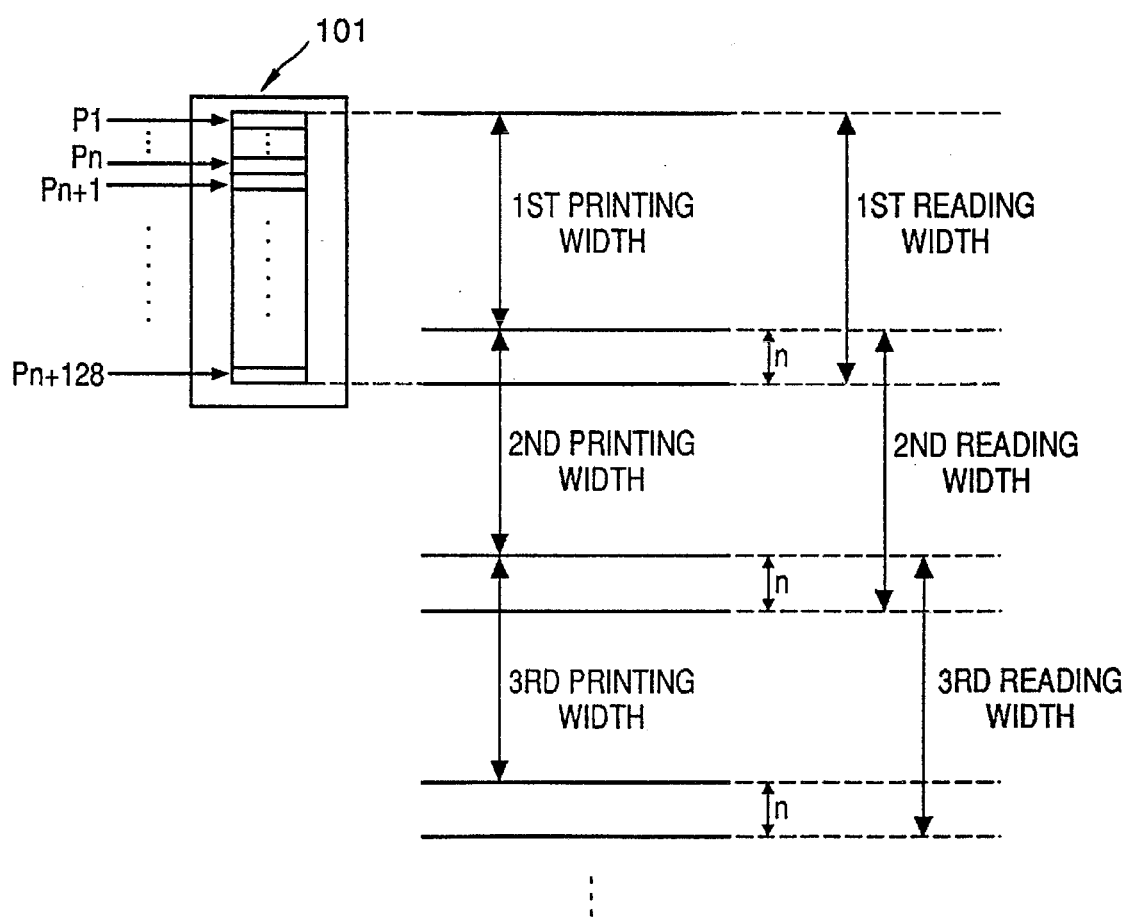

RECORDING APPARATUS FEATURING RECORDING ELEMENTS DISPOSED IN A LINE WHEREIN THE LINE IS SLANTED RELATIVE TO A SUBSCANNING DIRECTION AND A METHOD OF USING SAME

BACKGROUND OF THE INVENTION

The present invention relates to a copying machine which reads an original image and records an image on a recording medium such as a recording sheet and a control method for the copying machine.

Generally, a digital copying machine temporarily stores read image data into a memory, and generates binary image data by publicly-known binarization method, such as the dither method, and thereafter, it performs printing based on the binary image data.

Such construction, especially including an image memory, cannot avoid raising product costs.

There is provided a recording device where an image-reading scanner scans like a recording head of an ordinary serial printer to read an original image, and a recording head of the device scans to record an image in accordance with the read image data.

The recording device has a relatively small size, which reduces costs. However, the copying speed per one page is inevitably slow.

SUMMARY OF THE INVENTION

The present invention has been made in consideration of the above situation, and has as its object to provide a copying machine and control method for the copying machine which copies an original image by scanning of a image-reading scanner and scanning of a recording head, and which effectively controls reading and recording to perform high-speed copying.

To attain the aforementioned object, the present invention provides a recording apparatus using an image scanner including a plurality of reading elements and a recording head including a plurality of recording elements. The recording elements are disposed in a line, wherein the line is slanted at a predetermined angle with respect to a subscanning direction of the recording head. The apparatus includes:

a reading section for reciprocating the image scanner along a main-scanning direction and driving the image scanner to read an image when a forward-scanning and when reverse-scanning;

a signal generator for generating a recording signal for the recording elements based on image data read by the reading section;

recording head moving assembly for reciprocating the recording head along the main-scanning direction so that forward/reverse moving of the recording head substantially corresponds to that of the image scanner; and driving assembly for driving the recording elements of the recording head being moved by the recording head moving assembly in accordance with the recording signal generated by the signal generator.

Further, the present invention provides a copying machine control method for controlling a copying machine using an image scanner including a plurality of reading elements and a recording head including a plurality of recording elements. The recording elements are disposed in a line, wherein the line is slanted at a predetermined angle with respect to a subscanning direction of the recording head. The apparatus includes:

a reading step of reciprocating the image scanner along a main-scanning direction and driving the image scanner to read an image when forward-scanning and when reverse-scanning;

a signal generating step of generating a recording signal for the recording elements based on image data read in the reading step;

a recording head moving step of reciprocating the recording head along the main-scanning direction so that forward/reverse moving of the recording head substantially corresponds to that of the image scanner; and a driving step of driving the recording elements of the recording head being moved in the recording head moving step in accordance with the recording signal generated in the signal generating step.

Moreover, the present invention provides a copying machine using an image scanner including a plurality of reading elements and a recording head including a plurality of recording elements, including:

first moving assembly for reciprocating the image scanner along a main-scanning direction at a predetermined speed;

second moving assembly for, each time reciprocating motion of the image scanner is completed, moving the image scanner in a subscanning direction by a predetermined distance relative to an original as an object of reading;

third moving assembly for reciprocating the recording head along the main-scanning direction at a speed substantially equal to that of the image scanner;

fourth moving assembly for, each time reciprocating motion of the recording head is completed, moving a recording medium in the subscanning direction by the predetermined distance relative to the recording head;

a controller for driving the first and third moving assembly where substantially synchronizes the first moving assembly with the third moving assembly; and driving assembly for driving, under control of the controller, the recording elements of the recording head being moved by the third moving assembly based on image data read by driving of the first moving assembly.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 21A and 21B illustrate dither patterns when the same LUT address is employed in the embodiments;

FIG. 21C illustrates a dither pattern when the LUT address is converted in accordance with a forward/reverse scanning direction; and FIG. 22 illustrates the relation between scanning of the line sensor and that of the printer head.

DETAILED DESCRIPTION OF THE PREFERRED EMBODIMENTS

Preferred embodiments of the present invention will be described in detail in accordance with the accompanying drawings.

First, an ink-jet printer employed in the embodiments will be described below. The ink-jet printer performs printing by providing thermal energy to nozzles (recording elements) for discharging ink drops. Note that it will be apparent for those skilled in the art that any other recording devices and printers such as a thermal-transfer device can be employed instead of the ink-jet printer.

Generally, a serial printer such as an ink-jet printer, in which a recording head scans to record an image, performs recording by providing thermal energy based on image data to be recorded to each of a plurality of recording elements which are aligned on the recording head vertically with respect to a scanning direction.

Recently, recording devices, especially a recording device having an ink-jet head, can record a 300 dpi (dot per inch) image. That is, the device has a large number of nozzles for discharging ink drops, and further, distances between the nozzles are extremely small.

However, electricity consumed at one recording operation should be considered when employing all the nozzles. This means a large electric power source is required, which also raises the costs.

To solve these problems, dividing the nozzles into several groups and staggering ink-discharge timings of the groups can be considered. This enables image recording with even a small power source. In practice, after the respective groups have been provided with electricity, the recording head is moved to a next recording position.

Further, to raise recording speed, moving the recording head during each recording by one nozzle group can be considered. In this case, as timings for providing a recording pulse to the respective nozzle groups are staggered, the recording positions of the respective groups are shifted by a very small amount.

Taking account of this shift of the recording positions, arranging the groups at shifted positions in advance can be considered.

Instead of shifting nozzles in nozzle groups units, shifting each recording element (nozzle) by a very small amount to limit the electric power consumed for each recording by applying a pulse of a minimum level and to raise the recording speed, can be considered. The embodiments of the present invention will be described in accordance with this arrangement.

Figure 14:
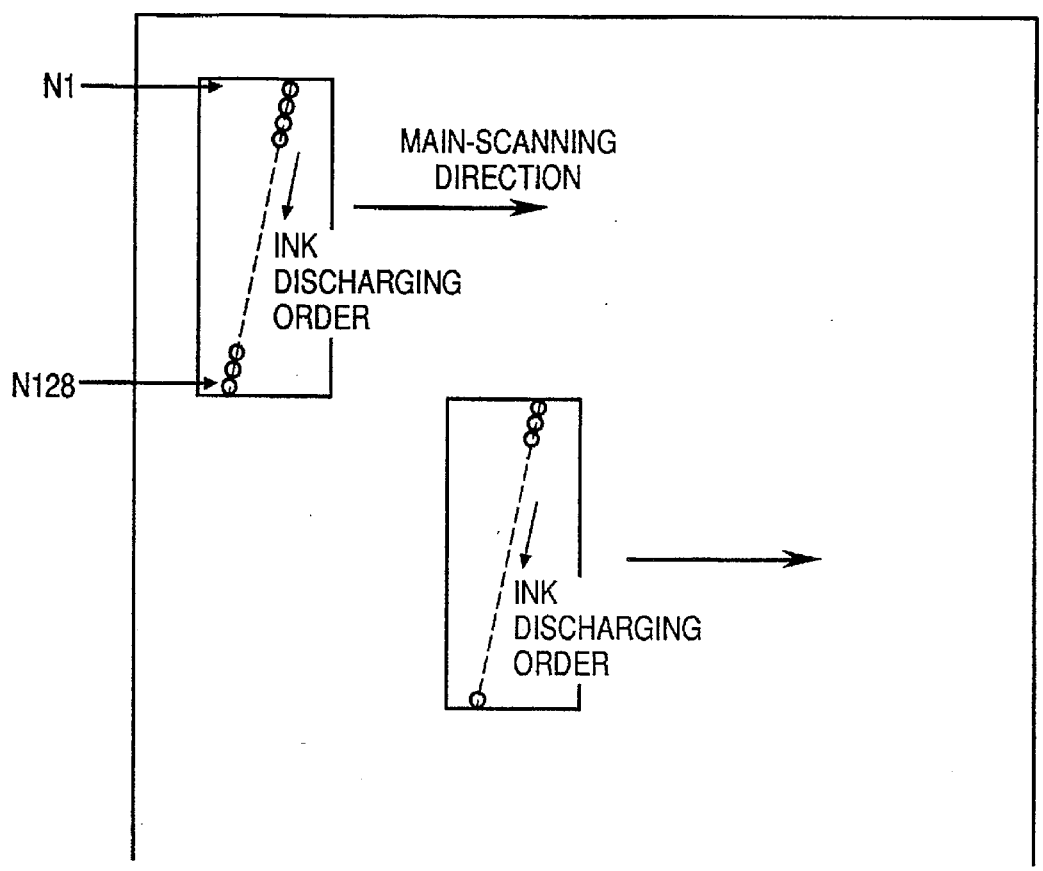
FIG. 14 illustrates an ink discharging order for a conventional ink-jet head.
Figure 15:
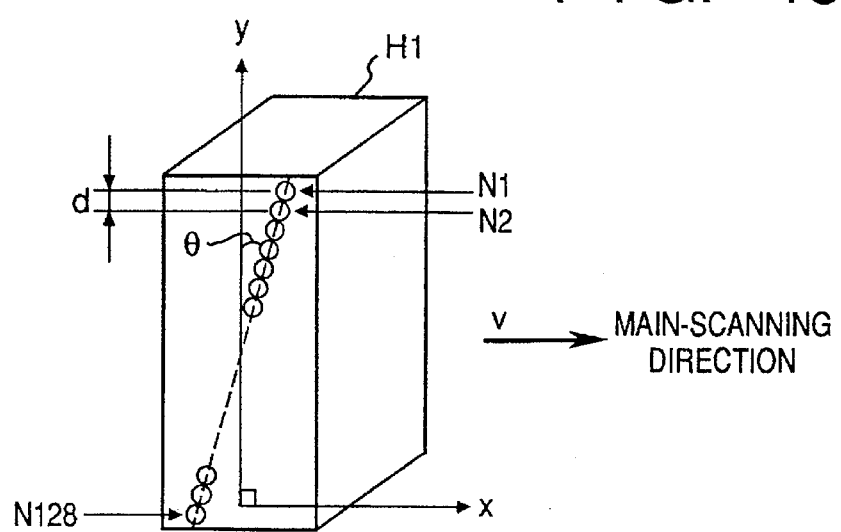
FIG. 15 illustrates the arrangement of the nozzles in an ink-jet head (recording head) according to the first embodiment.

FIG. 14 shows a head scanning example by an ink-jet printer according to the embodiments. In the printer, an ink-jet head comprising a plurality of nozzles (recording elements) scans for recording. The nozzles are aligned at a slope of a predetermined angle from a direction vertical to the scanning direction of the ink-jet head. This is to avoid slanting an image, e.g. a character to be recorded by staggering the recording timings of the nozzles, as described above, which may occur if the nozzles are not shifted. FIG. 15 shows the arrangement of the ink-jet head. In FIG. 15, ink-jet head H1 has nozzles N1 to N128 (one hundred and twenty-eight nozzles) aligned in one line, where the nozzle N1 side is slanted by angle θ from direction y vertical to recording direction x (main-scanning direction). The angle θ is obtained by the following equation:

$$\theta = \arctan(vt/d)$$

t: the interval between two adjacent nozzles
d: a difference between y-coordinates of two adjacent nozzles
v: scanning speed of the ink-jet head The ink discharging order is from the nozzle N1 to N128. While the ink-jet head scans along the direction x at the speed v. The recording results will be substantially aligned in one line vertical to the head moving direction.

To raise the recording speed, the head's scanning speed v can be raised by shortening the recording interval t. Otherwise, reciprocating recording where the head records when it returns to the home position can be performed. If the scanning speed v of the inkjet head is raised, the nozzle-driving interval t must be shortened. However, the interval t is determined in dependence upon the time for ink-discharging by a nozzle and the time for ink-refilling for the next ink-discharging. That is, shortening the interval t is limited to a certain period. To raise the recording speed within the limited interval, the reciprocating recording is necessary.

In a case where the ink-jet head records as it moves along direction −x, reverse to the main-scanning direction x, if the ink-jet head performs recording by discharging ink drops from the nozzles in the order from N1 to N128, similarly to the main-scanning directional recording, the recording results at this time will be slanted by $\theta'=\arc\tan(2vt/d)$ from the direction y. That is, in the forward main-scanning direction, the recording in the above ink-discharging order obtains recording results aligned in the direction y, while the reverse recording in the main-scanning direction (−x direction) in the same ink discharging order obtains recording results slanted by the angle $\theta'$ from the direction y. This reciprocating recording degrades recording quality.

To solve this problem, the ink discharging order for reverse-directional recording can be changed. In a case where image data for one scanning from an image scanner, to be described later, is input, it is necessary to synchronize reading by the scanner with recording and a change in the order of outputting the image data to the ink-jet head upon recording in a reverse direction.

The color copying machine having the above printer which performs reciprocating recording will be described in detail below.

[First Embodiment]

Figure 1:
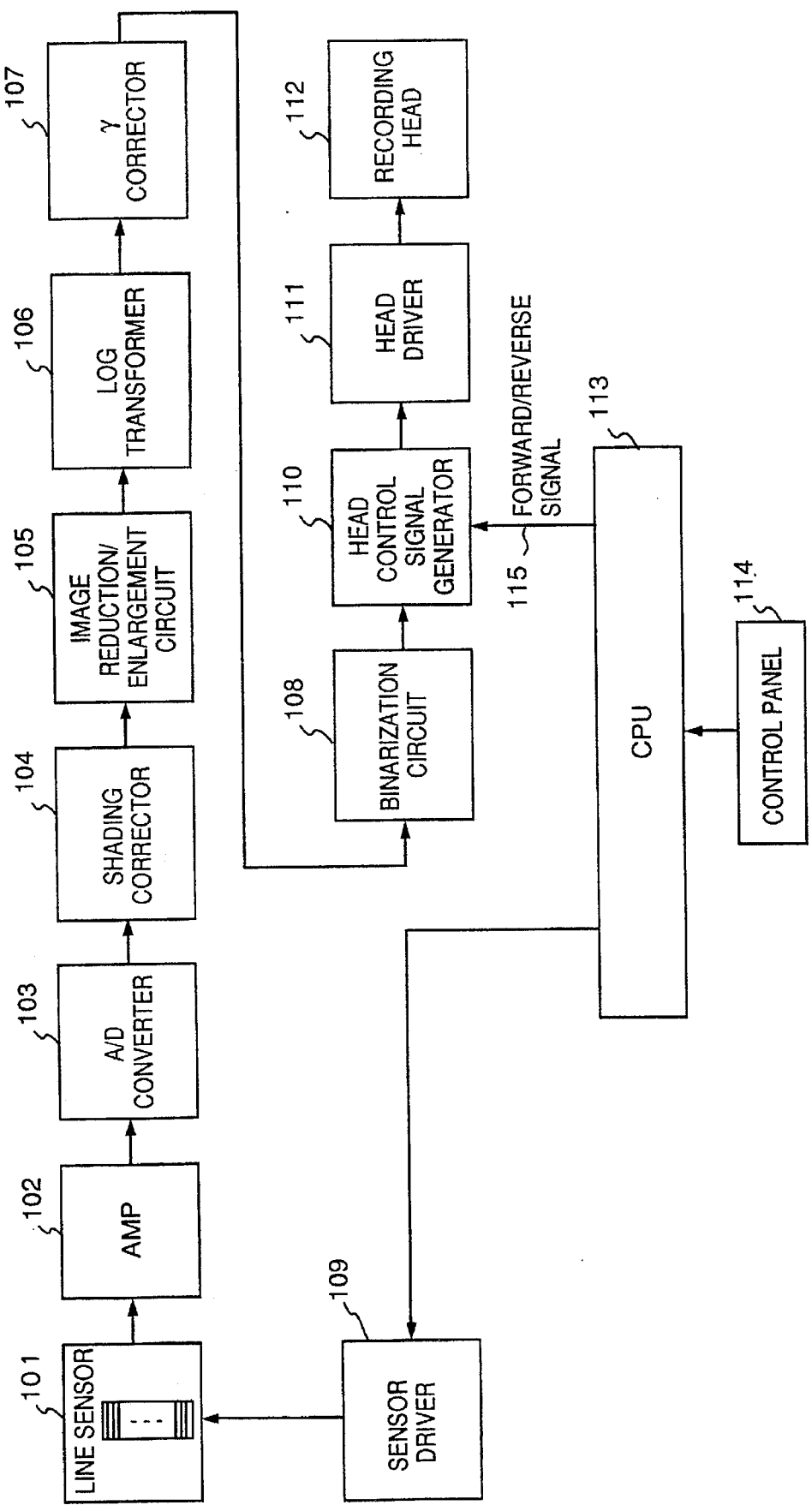
FIG. 1 is a block diagram showing the construction of a color copying machine, with an image processing portion as a central portion, according to a first embodiment of the present invention.
Figure 2:
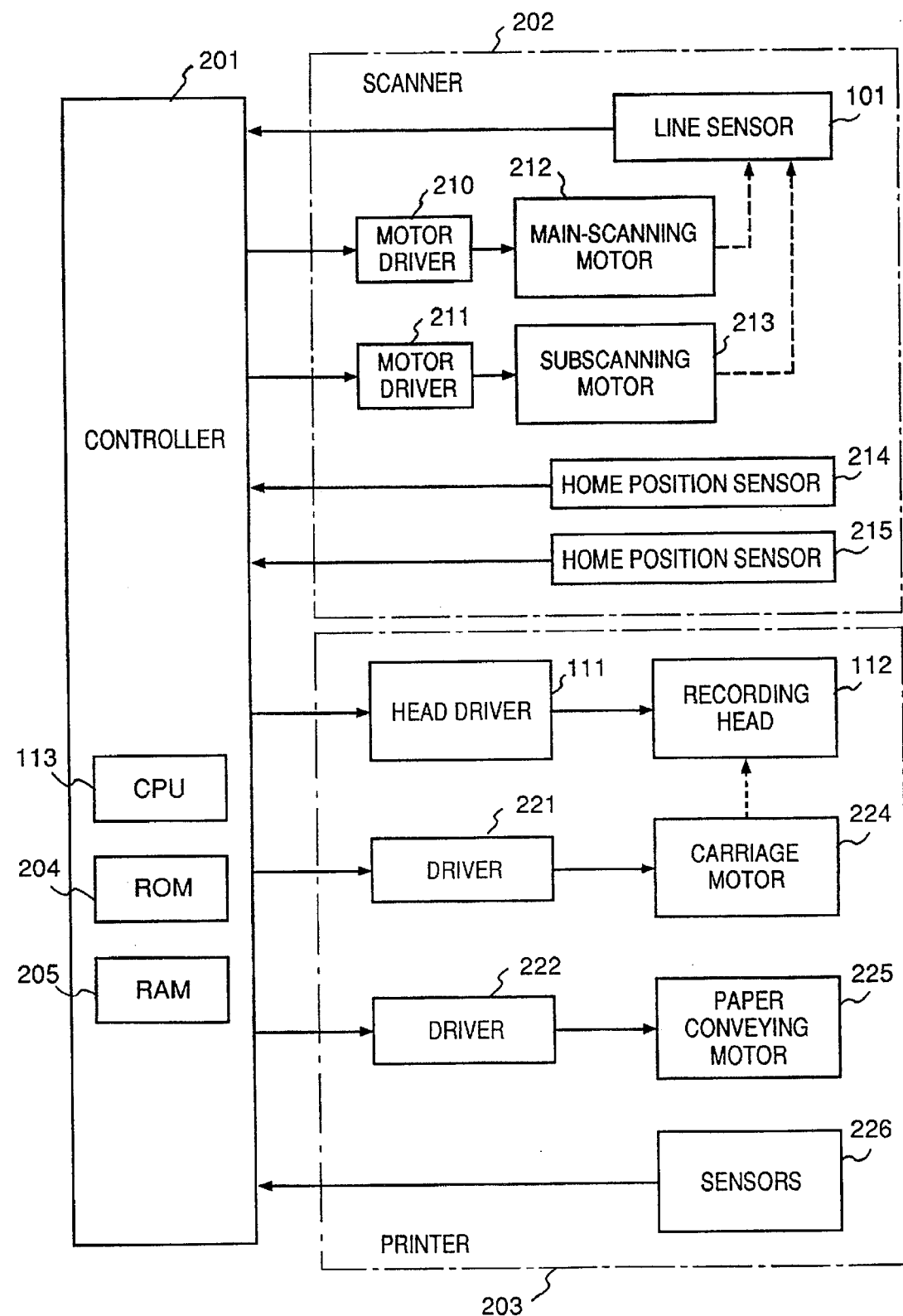
FIG. 2 is a block diagram showing the interface between a scanner, a printer and a controller constructing the color copying machine according to the first embodiment.

FIG. 1 shows the configuration of the color copying machine according to the first embodiment with an image processing portion as the central portion. FIG. 2 shows the interface between a scanner, a printer and a controller constructing the copying machine.

In FIG. 1, reference numeral 101 denotes a line sensor (image scanner) such as a CCD line sensor for reading an original image in one line (128 pixels) units and outputting luminance data; 102, an amplifier (AMP) for amplifying the output signal from the line sensor 101; 103, an A/D converter for converting the output signal from the amplifier 102 into eight-bit digital data; 104, a shading corrector for shading-correcting the digital signal converted by the A/D converter; 105, an image reduction/enlargement circuit for enlarging or reducing the image data corresponding to an image size. The image-size changing rate is manually set using keys provided on a control panel 114. Numeral 106 denotes a LOG transformer comprising, e.g., a look-up table for converting the luminance data into density data; 107, a γ corrector for converting the density data into density data corresponding to ink/paper quality and further corresponding to a user's instruction; and 108, a binarization circuit for binarizing the digital image signal by, e.g., the dither method.

Numeral 109 denotes a sensor driver for driving the line sensor 101 by outputting various clock signals to the sensor 101 on instructions from CPU 113; 110, a head control signal generator for inputting the binarized image data and outputting signals (DIGIT's and SEGMENT's to be described later) to control ink-discharging of the nozzles in accordance with a control signal from the CPU 113; and 111, a head driver for driving the respective nozzles of the recording head 112 to discharge ink drops in accordance with the signals from the head control signal generator 110. The recording head 112 performs recording by the ink-jet head method. The recording head 112 has the same construction as that described above (FIG. 15). The CPU 113 controls the copying sequence. Numeral 114 denotes a control panel.

In FIG. 2, numeral 201 denotes a controller for controlling the overall color copying machine of this embodiment. The controller 201 has the CPU 113 such as a microprocessor, ROM 204 in which control programs of the CPU 113 and various data are stored, and RAM 205 in which various data are temporarily stored and which is used as a work area for the CPU 113.

Numeral 202 denotes a scanner in which the line sensor 101 mounted on a carriage scans in a main-scanning direction; 212, a main-scanning motor for conveying the carriage in the main-scanning direction; 213, a subscanning motor for conveying the carriage in the subscanning direction; 210 and 211, motor drivers for respectively driving the motors 212 and 213; 214, a home position sensor for detecting a home position of the line sensor 101 in the main-scanning direction; and 215, a home position sensor for detecting a home position of the line sensor 101 in the subscanning direction.

Next, the construction of printer 203 will be described. Numeral 224 denotes a carriage motor for conveying a carriage on which the recording head 112 is mounted; 225, a paper conveying motor for conveying a recording sheet; 221 and 222, motor drivers for respectively driving the motors 224 and 225; and 226, various sensors including a paper feeding sensor, a paper discharging sensor, and a paper floating state sensor to be described later. Note that the carriage of the scanner 202 and the carriage of the printer 203 scan at substantially the same speed.

Figure 3:
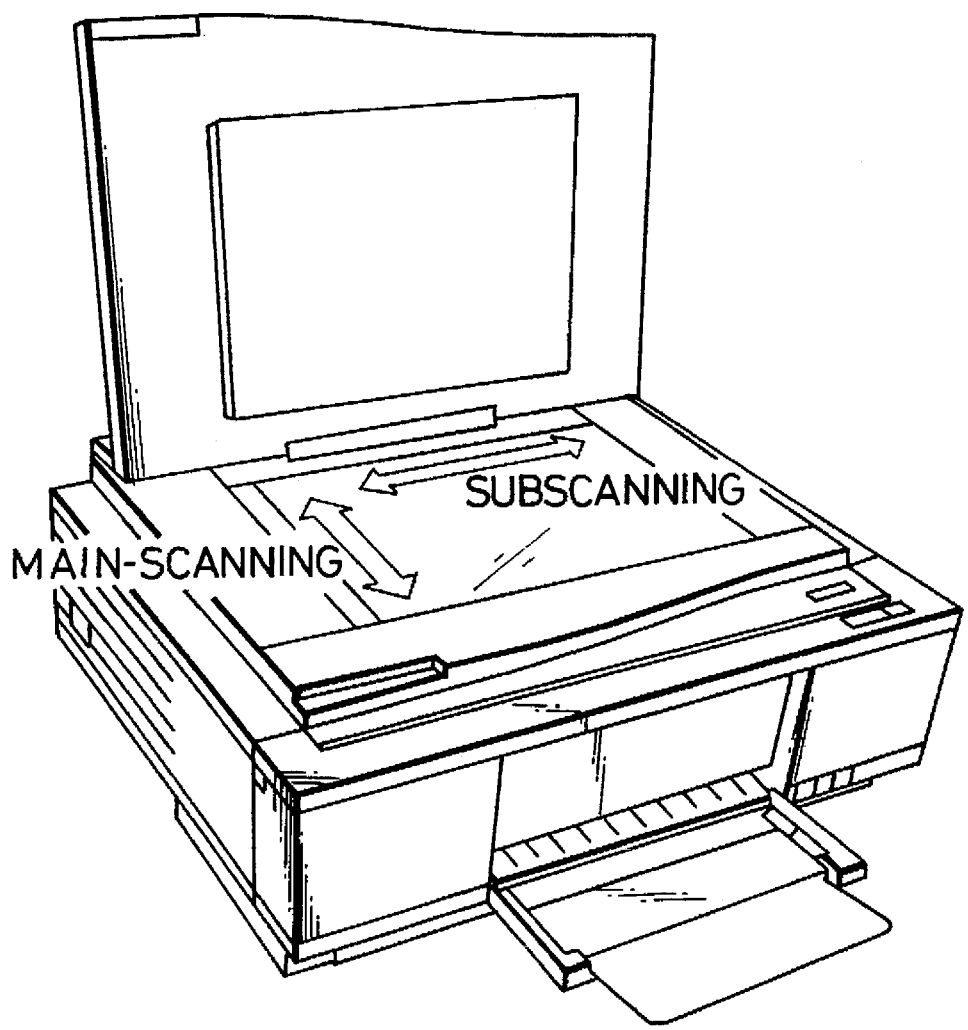
FIG. 3 is a perspective view showing the exterior appearance of the color copying machine according to the first embodiment.
Figure 4:
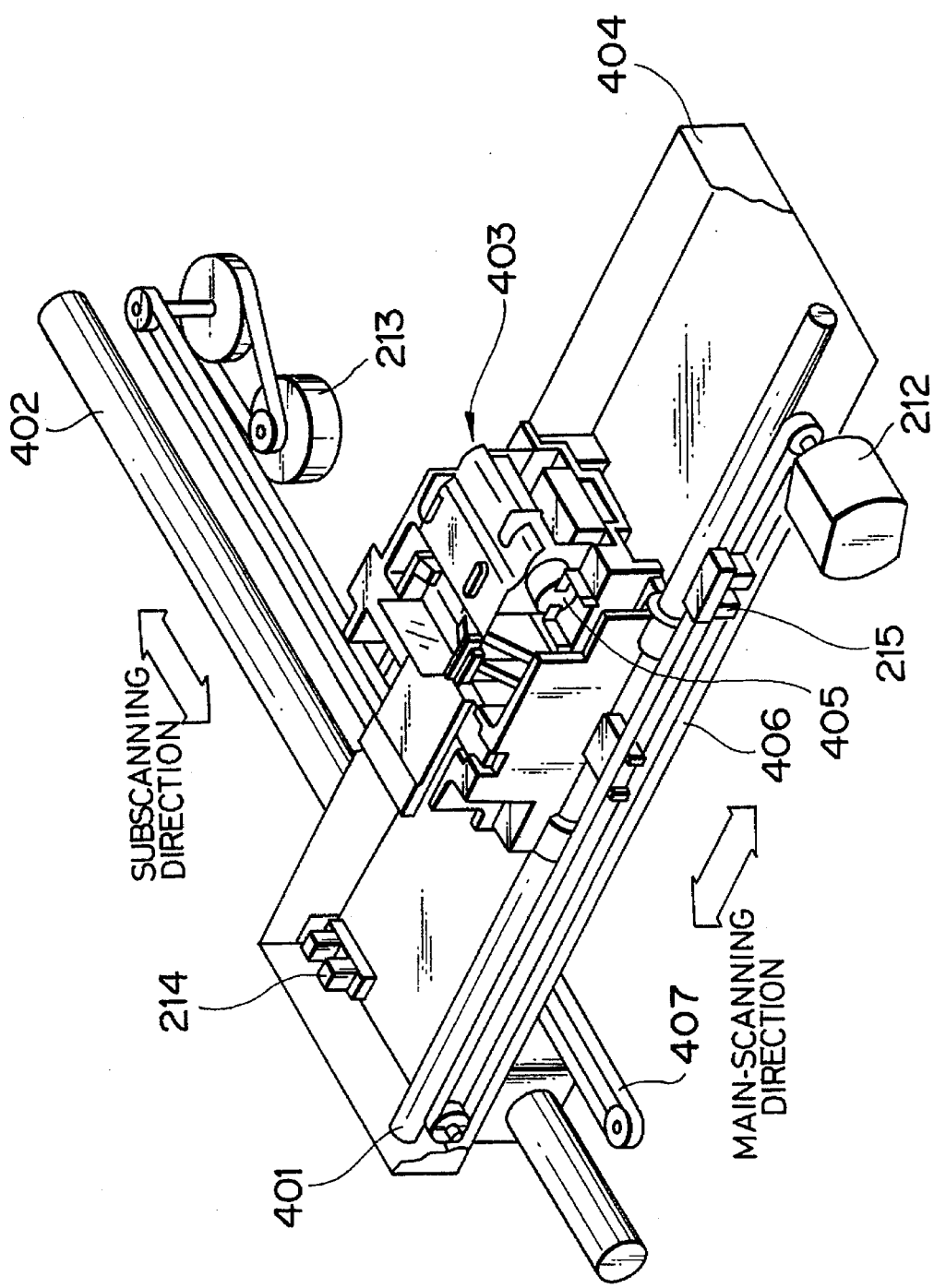
FIG. 4 is a perspective view of a line sensor conveying mechanism in the scanner of the color copying machine according to the first embodiment.
Figure 5:
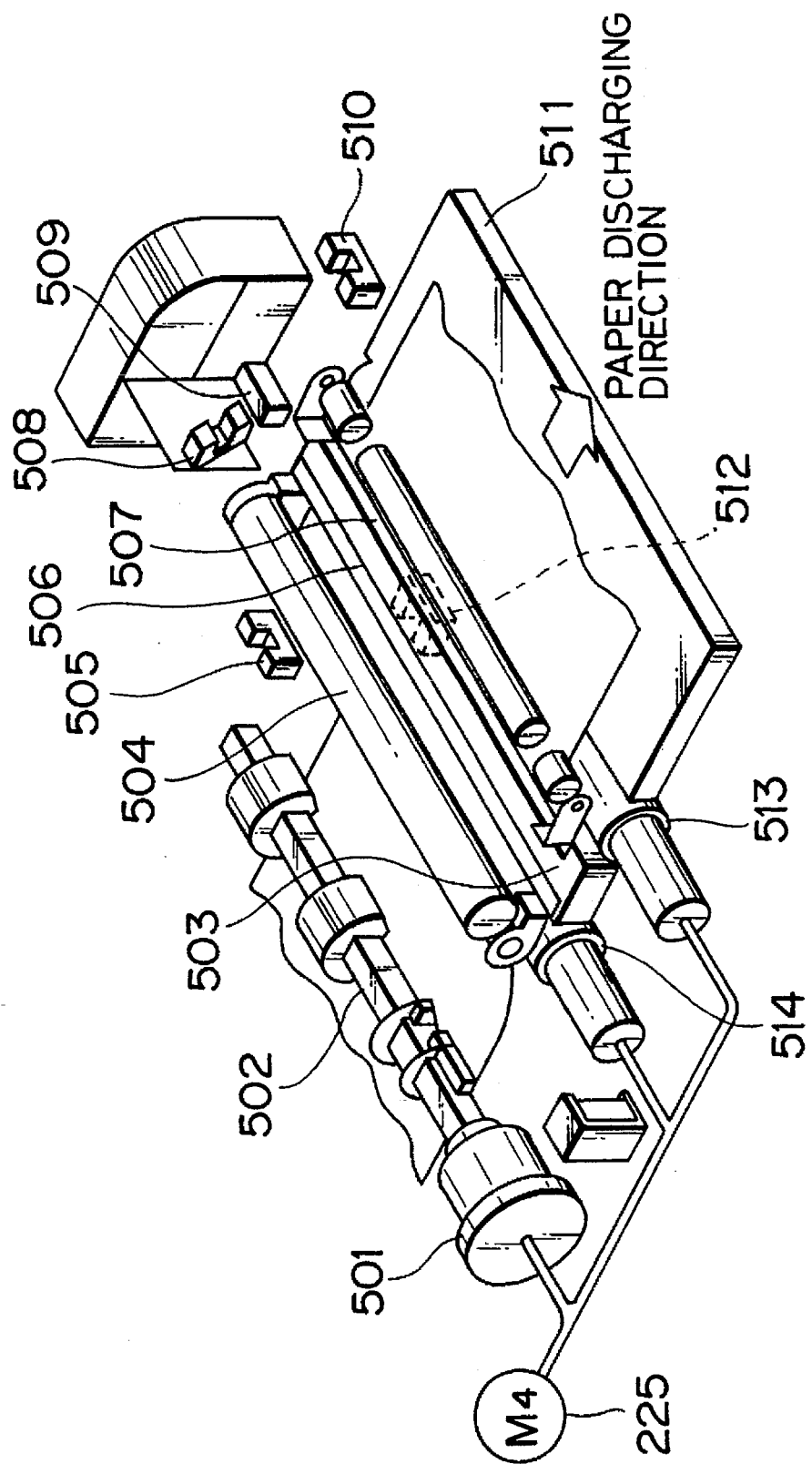
FIG. 5 is a perspective view of a mechanical portion of the printer of the color copying machine according to the first embodiment.

FIG. 3 shows the exterior appearance of the color copying machine of the present embodiment. FIG. 4 shows a mechanism for conveying the line sensor 110 of the scanner 202. FIG. 5 shows the construction of the printer 203. In these figures, parts corresponding to those described above have the same reference numerals.

In FIG. 4, numeral 403 denotes an image reader having the line sensor 101, for reading an original image by reciprocating in the main-scanning direction along main-scanning guide rail 401 in subscanning unit 404; 402, a subscanning guide rail for the subscanning unit 404 which moves in the subscanning direction by rotational driving of the subscanning motor 213; 405, a thermo-switch; 406, a main-scanning belt, a part of which is fixed to the image reader 403, for reciprocating motion of the image reader 403 in the main-scanning direction by rotation of the main-scanning motor 212; and 407, a subscanning belt, a part of which is fixed to the subscanning unit 404, for the reciprocating motion of the subscanning unit 404 in the subscanning direction by rotation of the subscanning motor 213.

Figure 6:
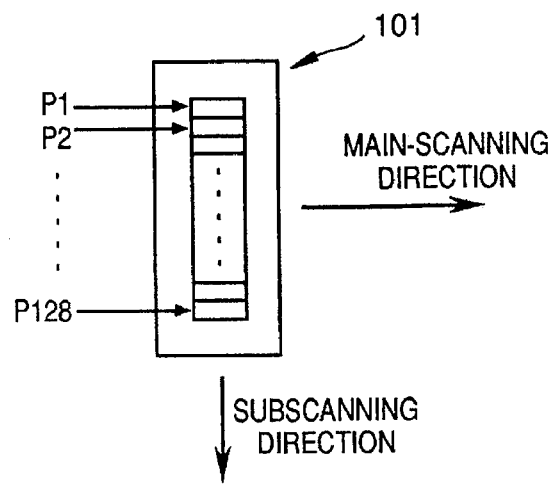
FIG. 6 illustrates the arrangement of sensor elements of the line sensor in the scanner according to the first embodiment.

The line sensor 101 has 400 dpi resolution. As shown in FIG. 6, the line sensor 101 has reading elements (P1 to P128) for one hundred and twenty-eight pixels aligned in a line in the subscanning direction. First, the line sensor 101 scans in the main-scanning direction to read an original image for one band, and at the same time, the printer 203 performs recording. Thereafter, the line sensor 101 (image reader 403) moves for one hundred and twenty-eight pixels (for a reading width) in the subscanning direction, and at this time, the recording sheet is moved in the subscanning direction. The line sensor 101 reverses in the main-scanning direction to read the original image, and at the same time, the head of printer 203 reverses in the main-scanning direction to perform recording based on the read image data. Then, the line sensor 101 moves for one hundred and twenty-eight pixels in the subscanning direction, and at this time, the recording sheet is conveyed for one band in the subscanning direction. Thus, image reading and recording in the main-scanning direction are performed. These processes are repeated several times as one copying operation.

In FIG. 5, the rotation of the paper conveying motor 225 is transferred to paper feeding roller 502 via paper feeding clutch 501, thus performing feeding of recording sheet. Numeral 503 denotes a platen opposite to an ink-discharging surface of the recording head 112. On this platen 503, the recording by the recording head 112 is made on the recording sheet conveyed by rotations of conveying rollers 504 and 514.

Numeral 505 denotes a paper feeding sensor for detecting the feeding of the recording sheet; 506 and 507, paper bails for preventing the recording sheet from floating; 508, a paper floating state sensor for detecting the floating state of the recording sheet; 509, a recording sheet width sensor; 510, a manual feeding sensor; 511, a paper discharging guide, 512, a paper discharging sensor; and 513, a paper discharging roller.

In this construction, the line sensor 101 of the scanner 202 reads the original image by reciprocally scanning in the main scanning direction and moving in the subscanning direction. At the same time, the recording head 112 of the printer 203 scans in the main-scanning direction. Further, the recording sheet is conveyed in the subscanning direction at each one-band recording. Repeating these processings forms a copied image quickly.

In this copying operation, when the recording head scans forward in the main-scanning direction, the CPU 113 sets the order of recording-applying pulses to be provided to the nozzles to N1→N128, since the nozzles N1 to N128 (ink discharging order) respectively correspond to the sensors P1 to P128. When the recording head 12 reverses in the main-scanning direction, the CPU 113 sets the order of recording-applying pulses to N128→N1 (See FIG. 7).

Figure 8:
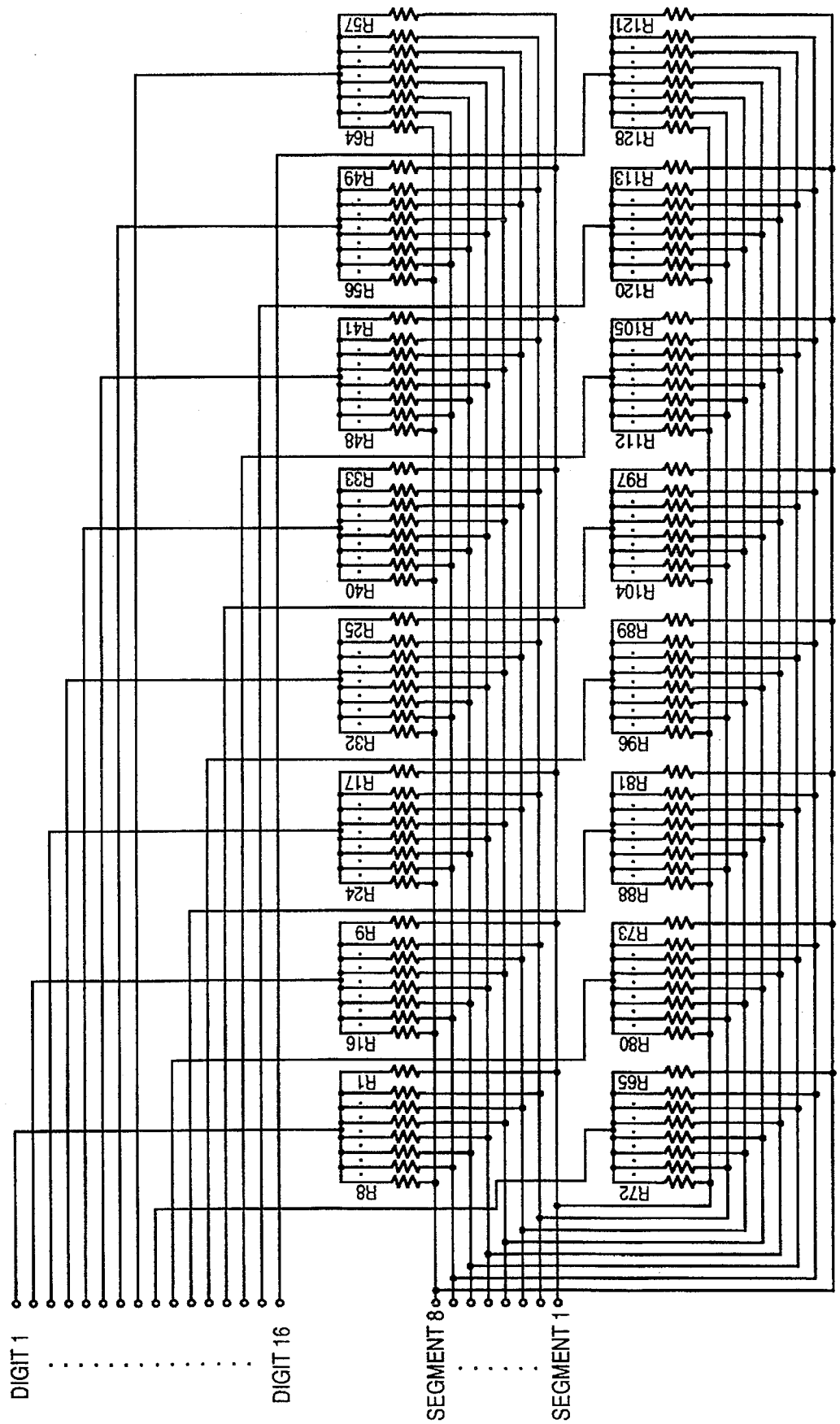
FIG. 8 illustrates the schematic of a recording head according to the first embodiment.

FIG. 8 shows the construction of the recording head 112. The one hundred and twenty-eight nozzles of the recording head 112 which can record an image at 400 dpi resolution are divided into sixteen groups each of which having eight nozzles. In FIG. 8, digit signals DIGIT 1 to DIGIT 16 are used for determining a group to be charged, and segment signals SEGMENT 1 to SEGMENT 8 are used for designating a nozzle to be driven in each group. In FIG. 8, resistors R1 to R128 are heating resistors corresponding to the nozzles N1 to N128. The recording head 112 of the ink-jet printer 203 discharges ink drops utilizing thermal energy, and more specifically, it changes ink state by thermal energy applied from these heating resistors for discharging ink drops.

RGB signals outputted from the scanner 202 are converted into Y (yellow), M (magenta), C (cyan) and Bk (black) signals by the LOG transformer 106. The respective color component data is supplied to the recording head 112 via the binarization circuit 108. Hereinafter, description will be made regarding only one set of color component data.

Figure 9:
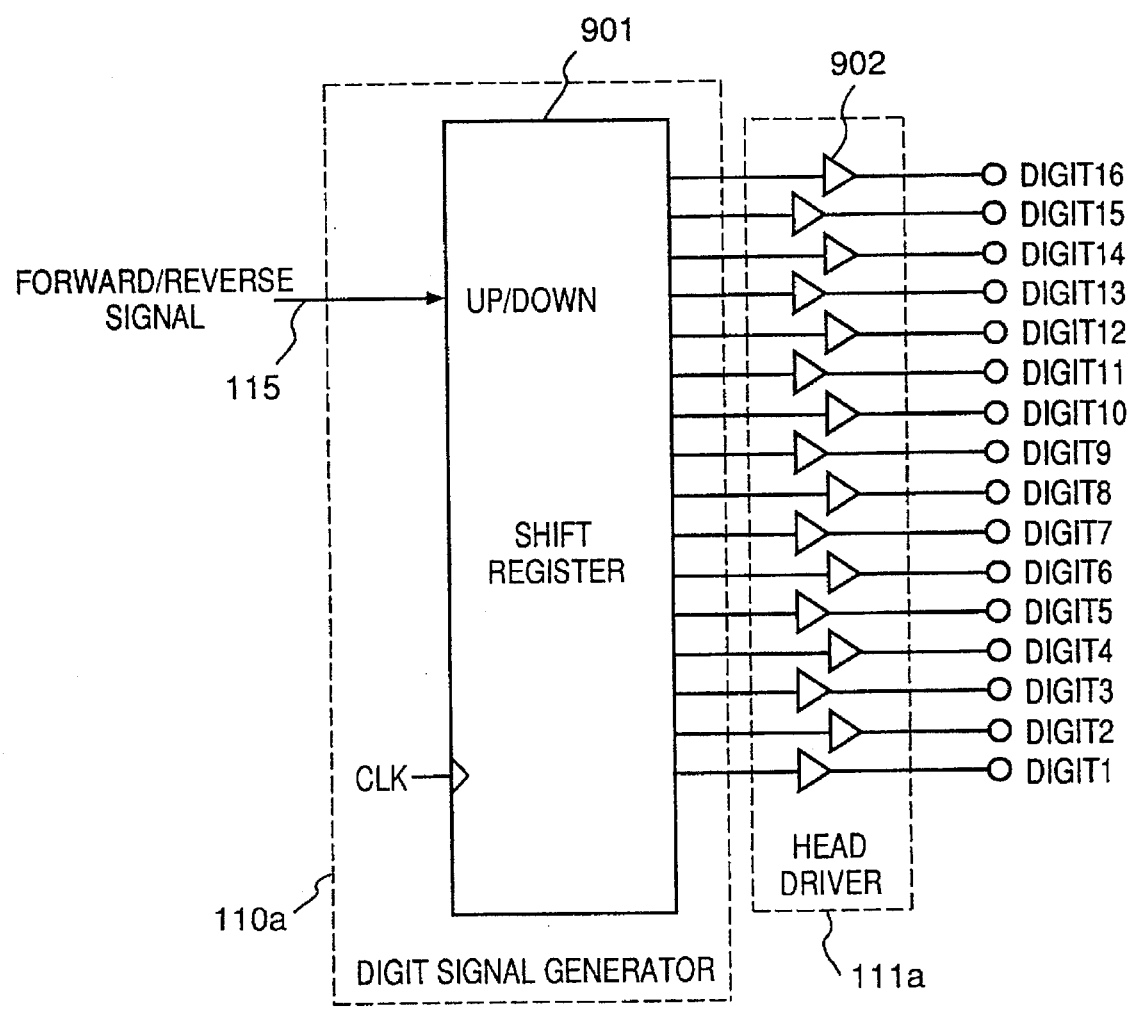
FIG. 9 illustrates a digit signal generator in a head control signal generator according to the first embodiment.
Figure 10:
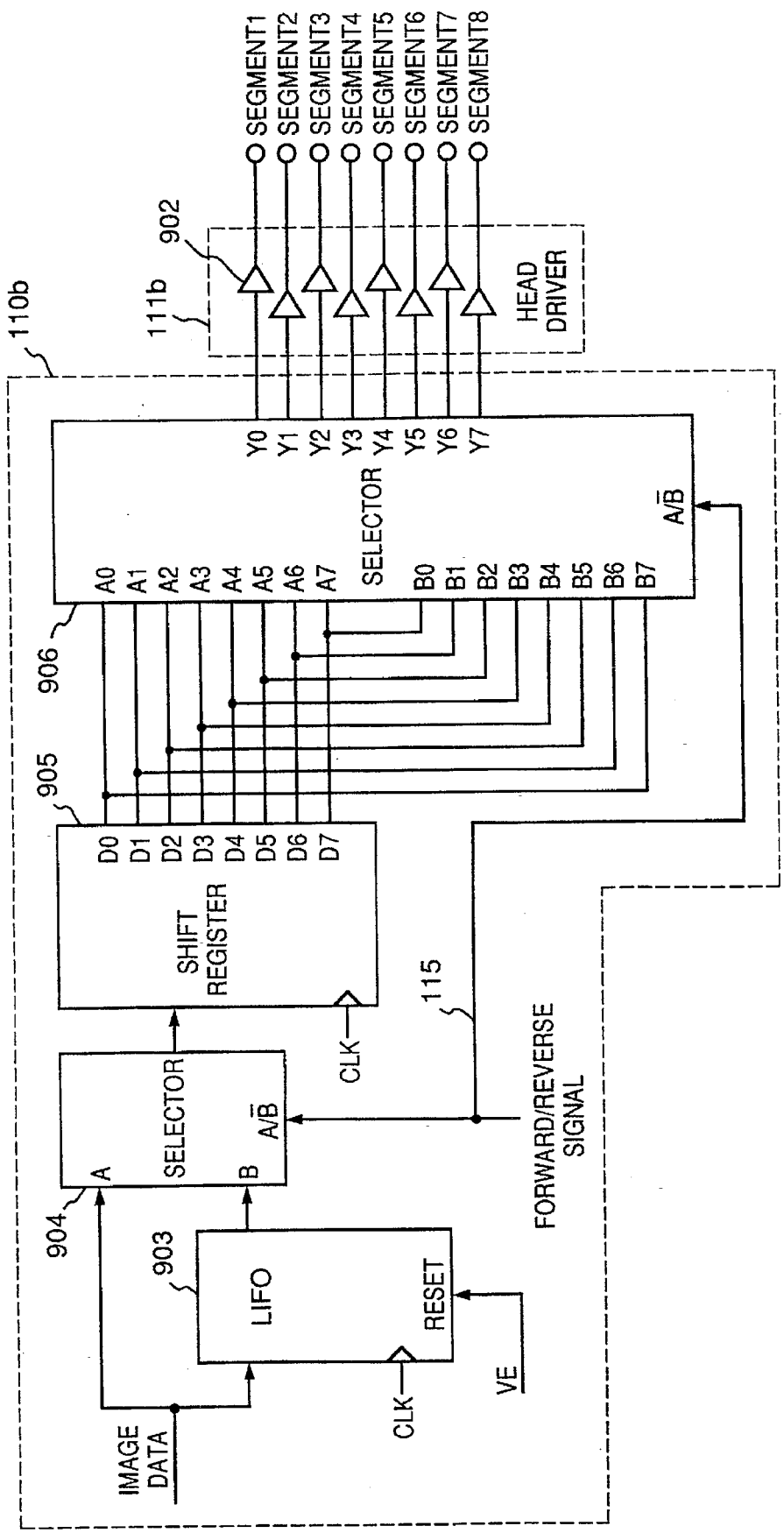
FIG. 10 illustrates a segment signal generator in the head control signal generator according to the first embodiment.

FIGS. 9 and 10 show the construction of the head control signal generator 110 and the head driver 111.

FIG. 9 shows digit signal outputting portions 110a and 111a for outputting the signals DIGIT in the head control signal generator 110 and the head driver 111. FIG. 10 shows segment signal outputting portions 110b and 111b for outputting the signals SEGMENT.

In FIG. 9, shift register 901 switches its shift-outputting order by forward/reverse signal 115 in either an order from DIGIT 1 to DIGIT 16 (forward-direction recording in the main-scanning direction: when the forward/reverse signal 115 is at a high level) or an order from DIGIT 16 to DIGIT 1 (reverse-direction recording in the main-scanning direction: when the forward/reverse signal 115 is at a low level). Numeral 902 denotes a driver.

In FIG. 10, selector 904 and LIFO (last-in-first-out memory) 903 receive image data binarized by the binarization circuit 108. When the forward/reverse signal 115 is at the high level, the selector 904 selects the input image data, while it selects output from the LIFO 903 when the forward/reverse signal 115 is at the low level. The shift register 905 shift-in-inputs the output the data from the selector 904 and outputs the eight-bit data to the selector 906 as parallel signals. The selector 906 selects A input when the forward/reverse signal 115 is at the high level, while it selects B input when the forward/reverse signal 115 is at the low level.

When the recording head 112 scans forward in the main-scanning direction, the image data inputted into the head control signal generator 110 enters the shift register 905 via the selector 904. The input eight-bit data inputted into the shift register 905 is outputted through the A input of the selector 110 to drive the respective nozzles of the recording head 112.

When the recording head 112 reverses in the main-scanning direction, as it records read image data sequentially from the end of the data, the LIFO 903 reverses the outputting order of the read image data for one band from the end to the header. The shift register 904 converts the reversed image data into eight-bit data. The B input of the selector 906 is selected to further upside-down reverse the data. Thus, in the reverse recording of the recording head 112, the ink-discharging order is N128→N1.

Figure 11:
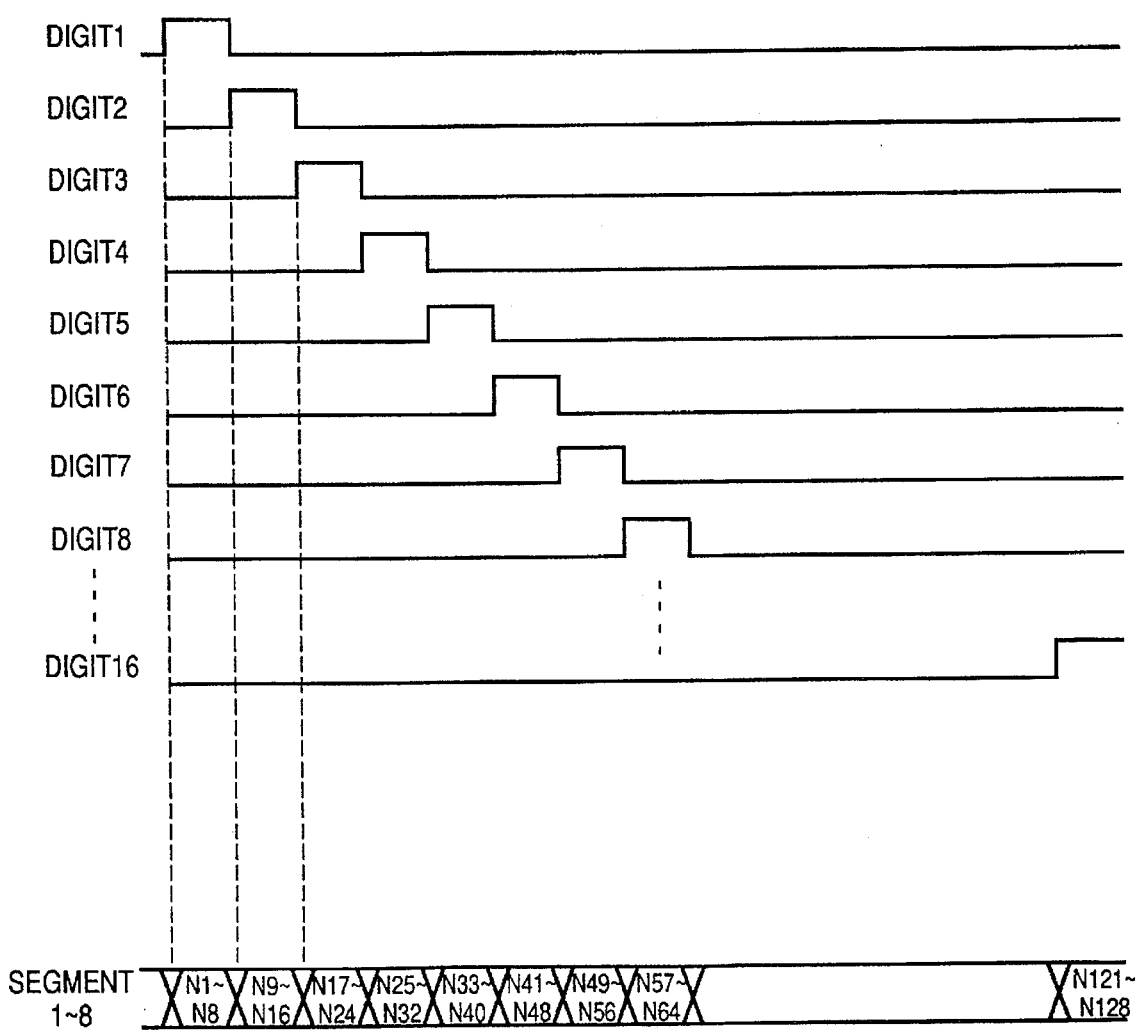
FIG. 11 is a timing chart showing signal timings upon moving the recording head forward in the main-scanning direction.
Figure 12:
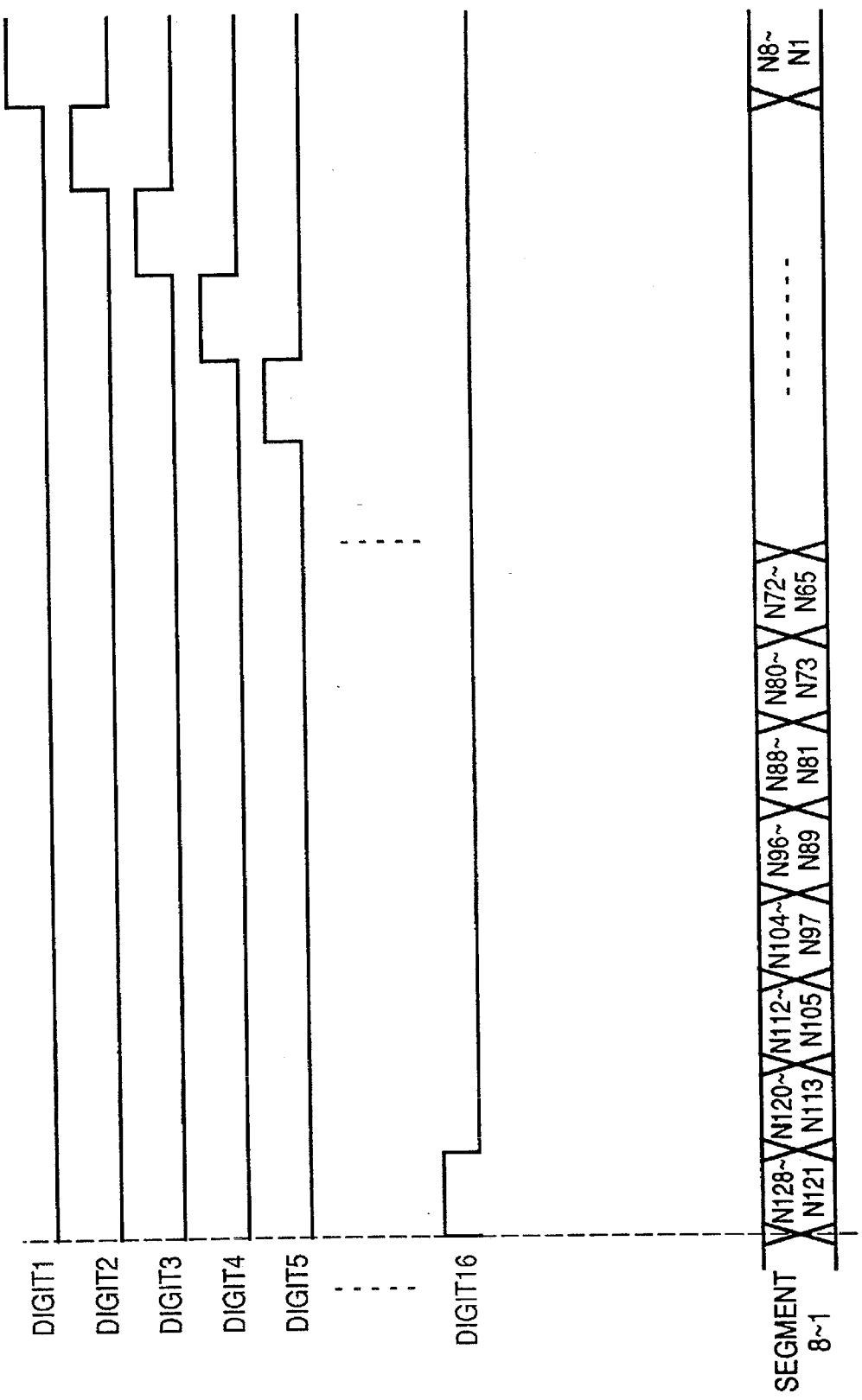
FIG. 12 is a timing chart showing signal timings upon moving the recording head in the reverse direction in the main-scanning direction.

FIGS. 11 and 12 show timing of the recording operation.

FIG. 11 shows the timing when the recording head 112 scans forward in the main-scanning direction. In FIG. 11, the digit signals are outputted in the order DIGIT 1→DIGIT 16, and at each time one DIGIT is outputted, a nozzle to discharge an ink drop is selected by the segment signal (SEGMENT 1–SEGMENT 8).

FIG. 12 shows the timing when the recording head 112 reverses in the main-scanning direction. In this case, as the nozzles of the recording head 112 are driven in the order N128→N1, the digit signals are outputted in the order DIGIT 16→DIGIT 1. Each time one DIGIT is outputted, a nozzle to discharge an ink drop is selected by the segment signal (SEGMENT 8-SEGMENT 1).

In this manner, upon forward-scanning of the recording head 112 in the main-scanning direction, the nozzles N1 to N8 are simultaneously activated at the outputting of DIGIT 1. Similarly, at the outputting of DIGIT 2, the nozzles N9 to N16 are simultaneously activated; at the DIGIT 3, the nozzles N17 to N24; at the DIGIT 4, the nozzles N25 to N32; at the DIGIT 5, the nozzles N33 to N40; at the DIGIT 6, the nozzles N41 to N48; at the DIGIT 7, the nozzles N49 to N56; at the DIGIT 8, the nozzles N57 to N64; at the DIGIT 9, the nozzle N65 to N72; at the DIGIT 10, the nozzles N73 to N80; at the DIGIT 11, the nozzles N81 to N88; at the DIGIT 12, the nozzles N89 to N96; at the DIGIT 13, the nozzles N97 to N104; at the DIGIT 14, the nozzles N105 to N112; at the DIGIT 15, the nozzles Nl13 to N120; and at the DIGIT 16, the nozzles N121 to N128.

At this time, the line sensor 101 of the scanner 202 moves in the main-scanning direction to read an original image, and at the same time, the recording head 112 of the printer 203 is conveyed in the main-scanning direction to perform recording in accordance with the aforementioned procedure. As the scanning of the necessary area of the original image by the line sensor 101 has been completed, the line sensor 101 (subscanning unit 404) is moved in the subscanning direction by one hundred and twenty-eight pixels, and at the same time, a recording sheet is conveyed in the subscanning direction by one hundred and twenty-eight pixels (recording width).

Next, the recording by the recording head 112 when it reverses in the main-scanning direction will be described. As described above, the CPU 113 sets the forward/reverse signal 115 to the low level so that the ink discharging order will be N128→N1. The shift register 901 in FIG. 9 reverses its shift direction by the forward/reverse signal 115 from the CPU 113. In the selector 904 in FIG. 10, the B input delayed for one line (128 pixels) by the LIFO 903 is selected and inputted into the shift register 905. The shift register 905 converts the input image signal, which has reverse the order of image data for one band, into eight-bit parallel signals, and outputs the signals into the selector 906. The selector 906 selects the B input by the forward/reverse signal 115 from the CPU 113. Thus, the order of the segment signals is reversed.

FIG. 12 shows the timing for driving the recording head 112 upon reversing in the main-scanning direction.

First, the nozzles N128 to N121 are activated at outputting of the DIGIT 16. Similarly, at outputting of the DIGIT 15, the nozzles N120 to N113 are simultaneously activated; the DIGIT 14, the nozzles N112 to N105, the DIGIT 13, the nozzles N104 to N97; the DIGIT 12, the nozzles N96 to N89; the DIGIT 11, the nozzles N88 to NS1; the DIGIT 10, the nozzles N80 to N73; the DIGIT 9, the nozzles N72 to N65; the DIGIT 8, the nozzles N64 to N57; the DIGIT 7, N56 to N49; the DIGIT 6, the nozzles N48 to N41; the DIGIT 5, the nozzles N40 to N33; the DIGIT 4, the nozzles N32 to N25; the DIGIT 3, the nozzles N24 to N17; the DIGIT 2, the nozzles N16 to N9; and the DIGIT 1, the nozzles N8 to N1.

In this manner, when the recording head 112 reverses in the main-scanning direction, it discharges ink drops in the ink discharging order which are relative to the forward-scanning recording. When the line sensor 101 of the scanner 202 has finished scanning of a necessary area of the original, the line sensor 101 is moved in the subscanning direction by one hundred and twenty-eight pixels, and the recording sheet in the printer 203 is conveyed by one hundred and twenty-eight pixels in the subscanning direction. These operations are repeated to realize the reciprocating recording.

In the present embodiment, the binarization circuit performs binarization based on the dither method. Since the reading elements of the line sensor 101 are along the subscanning direction, the error diffusion method and the mean density conservation method may be employed by providing a memory for storing read image data for several lines as a two-dimensional look-up area.

Figure 13:
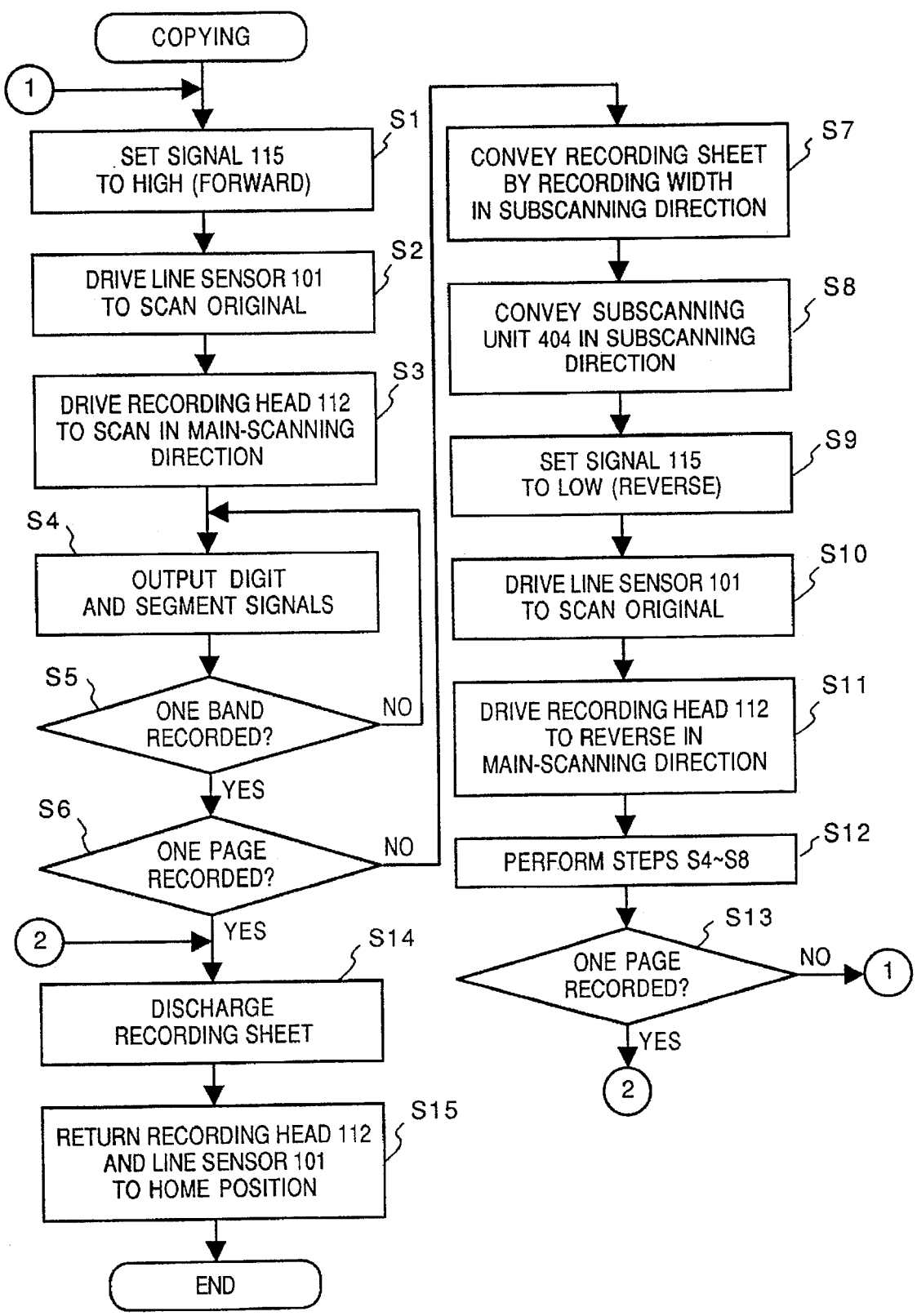
FIG. 13 is a flowchart showing the copying processing by the controller in the color copying machine according to the first embodiment.

FIG. 13 shows the control by the CPU 113 of a color copying machine according to the present embodiment. The control program for this processing is stored in the ROM 204.

The flow in FIG. 13 starts when, e.g., a copying start key on the control panel 114 is pressed. In step S1, the forward/reverse signal 115 is set to the high level (for the forward-scanning of the recording head 112). In step S2, the line sensor 101 of the scanner 202 starts scanning and reads an original. The image processor shown in FIG. 1 processes a read image signal. The head control signal generator 110 converts the signal into a signal for driving the recording head 112. Next, the carriage motor 224 is driven to have the recording head 112 start the scanning in step S3. The head driver 111 outputs the digit signals and segment signals to the recording head 112 for driving the recording head 112, thus the recording head 112 records an image for one scanning (one band).

In step S5, if the reading and recording for one band have been completed, whether copying for one page is over or not is examined in step S6. If NO, the process proceeds to step S7, in which the recording sheet is conveyed by the recording width in the subscanning direction. In step S8, subscanning unit 404 of the scanner 202 is moved by the reading width for a next band to be read out in the subscanning direction.

In step S9, the forward/reverse signal 115 is set to the low level. In step S1O, the line sensor 101 reverses in the main-scanning direction to read the original in a similar manner to that of step S2. In step S11, the recording head 112 starts to reverse in the main-scanning direction, and records the read image data of step S12 in a similar manner to that in steps S4 to S8. In step S13, whether copying for one page is over or not is examined. If NO, the process returns to step S1, to start the scanning of the line sensor 101 for image reading and recording.

In step S6 or S13, if it is determined that the copying is over, the recording sheet is discharged in step S14, and the recording head 112 and the line sensor 101 are returned to respective home positions in step S15, and then the copying for one page ends.

As described above, according to the embodiment, the line sensor 101 performs the reciprocating reading and the recording head 112 also performs reciprocating recording, which enables high-speed copying.

It should be noted that the above copying is performed with respect to image data which has not been reduced nor enlarged by the image reduction/enlargement circuit 105 (this copying will be referred to as "same size copying). Accordingly, in this case, the image reduction/enlargement circuit is unnecessary.

The shading corrector 104 and the LOG transformer 106 are publicly-known circuits, and they are realized by a look-up table in the embodiment for real-time conversion.

Herein below, description will be made regarding the binarization circuit 108.

Figure 20:
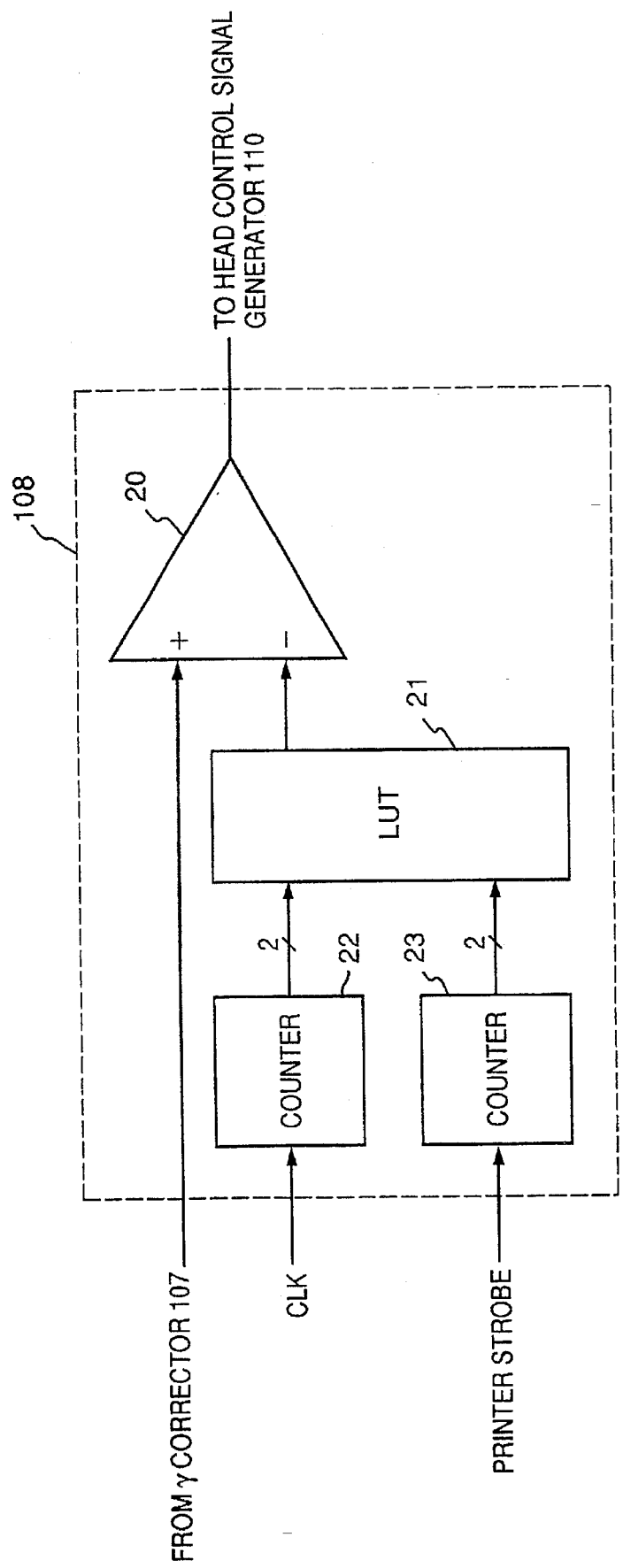
FIG. 20 is a block diagram showing the configuration of a binarization circuit according to the embodiments.

As described above, the binarization circuit 108 performs binarization based on the dither method. To raise the processing speed and shorten the time from binarization of read image data to supplying of processed data to the recording head, and further to reduce memory capacity, the present embodiment employs a construction of the binarization circuit 108 as shown in FIG. 20. It should be noted that the binarization circuit 108 receives eight-bit (256 levels) data per one pixel from the γ corrector 107.

The size of the dither matrix employed in the dither method is 4×4. To use each element of the 4×4 matrix, only four address signal lines (four bits) are required.

In FIG. 20, a positive terminal of comparator 20 is provided with eight-bit data outputted from the γ corrector 107. A negative terminal of the comparator 20 is provided with eight-bit data outputted from look-up table (LUT) 21 in which each threshold value data for each of the elements of the dither matrix have been stored. Counter 22 inputs a timing signal (CLK) for outputting of the eight-bit data from the γ corrector 107, and supplies a count value as a two-bit address signal to the LUT 21.

Counter 23 counts a printer-strobe signal generated at periods for driving all the nozzles of the recording head, and outputs a count value (two bits) as an address signal to the LUT 21.

According to the above construction, the LUT 21 outputs one of the threshold values of the 4×4 dither matrix, and if the value outputted from the γ corrector 107 is greater than the threshold value, the comparator 20 outputs a logical-high level signal.

In this manner, the present embodiment enables the minimum delay time in the time period between reading by the line sensor 101 and data supplying to the recording head 112. Further, the embodiment substantially omits a memory between these processings.

The present embodiment is applied to a color copying machine, and therefore, the above construction is provided for each color component. Since the carriage of the printer 203 comprises heads for respective color components at predetermined intervals, in practice, buffer memories for time corresponding to these distances are necessary. However, when monochromatic recording is performed, the memories are essentially unnecessary.

Figures 21A, 21B, 21C:
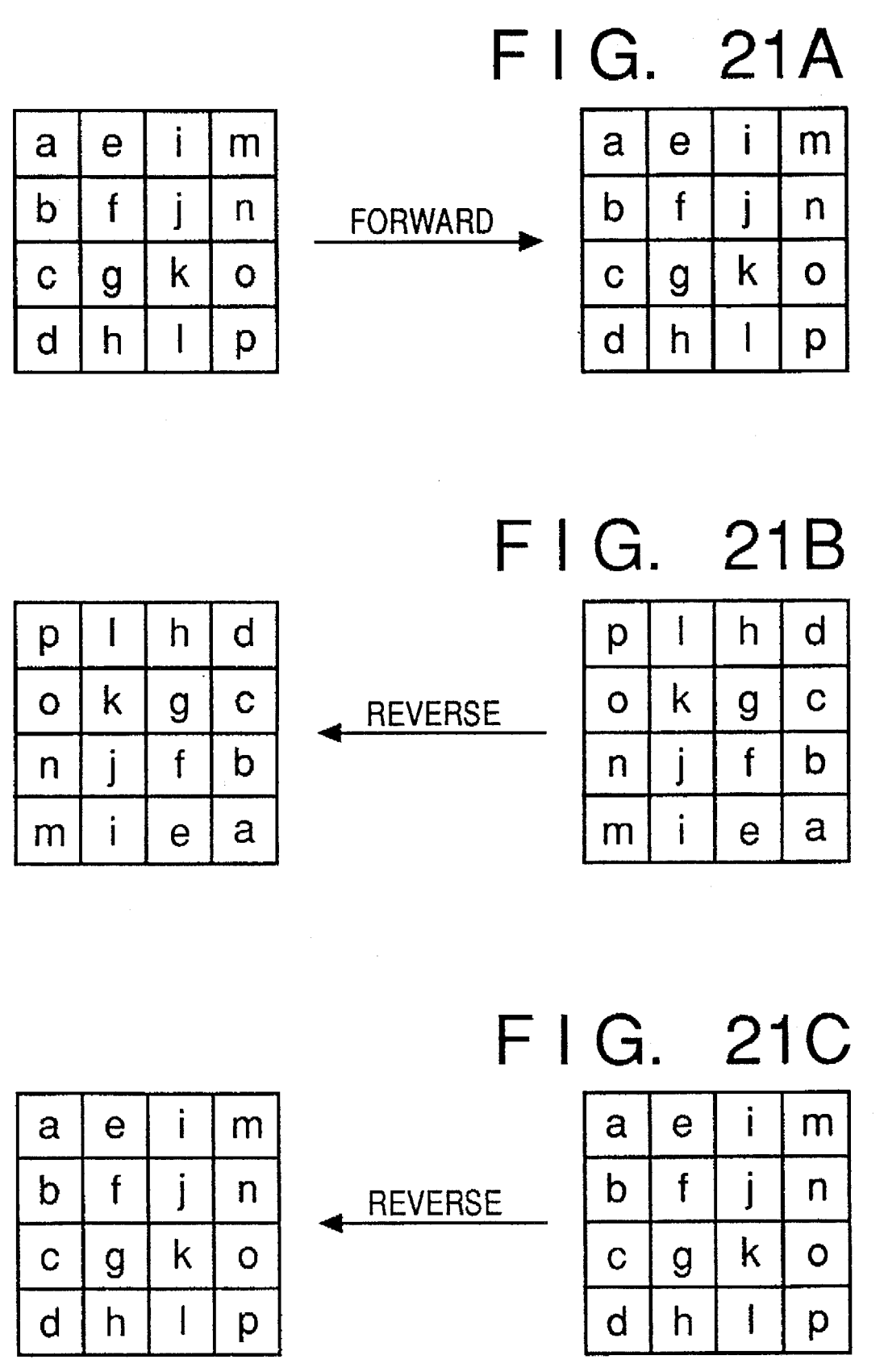

Preferably, the address to the LUT 21 may be converted in accordance with the forward/reverse scanning direction. This is because employing the same address in both the forward and reverse directions changes the dither pattern as shown in FIGS. 21A and 21B, changing image quality in band units. However, converting the LUT address in correspondence with the forward/reverse scanning direction obtains substantially the same dither pattern as shown in FIG. 21C.

The above-mentioned substantially the same dither pattern can be achieved by supplying the forward/reverse signal 115 to the LUT 21 as a fifth address bit.

As described above, the color copying machine according to the first embodiment records an image by scan-reading of an original image and scan-recording synchronized with the reading.

[Second Embodiment]

Figure 16:
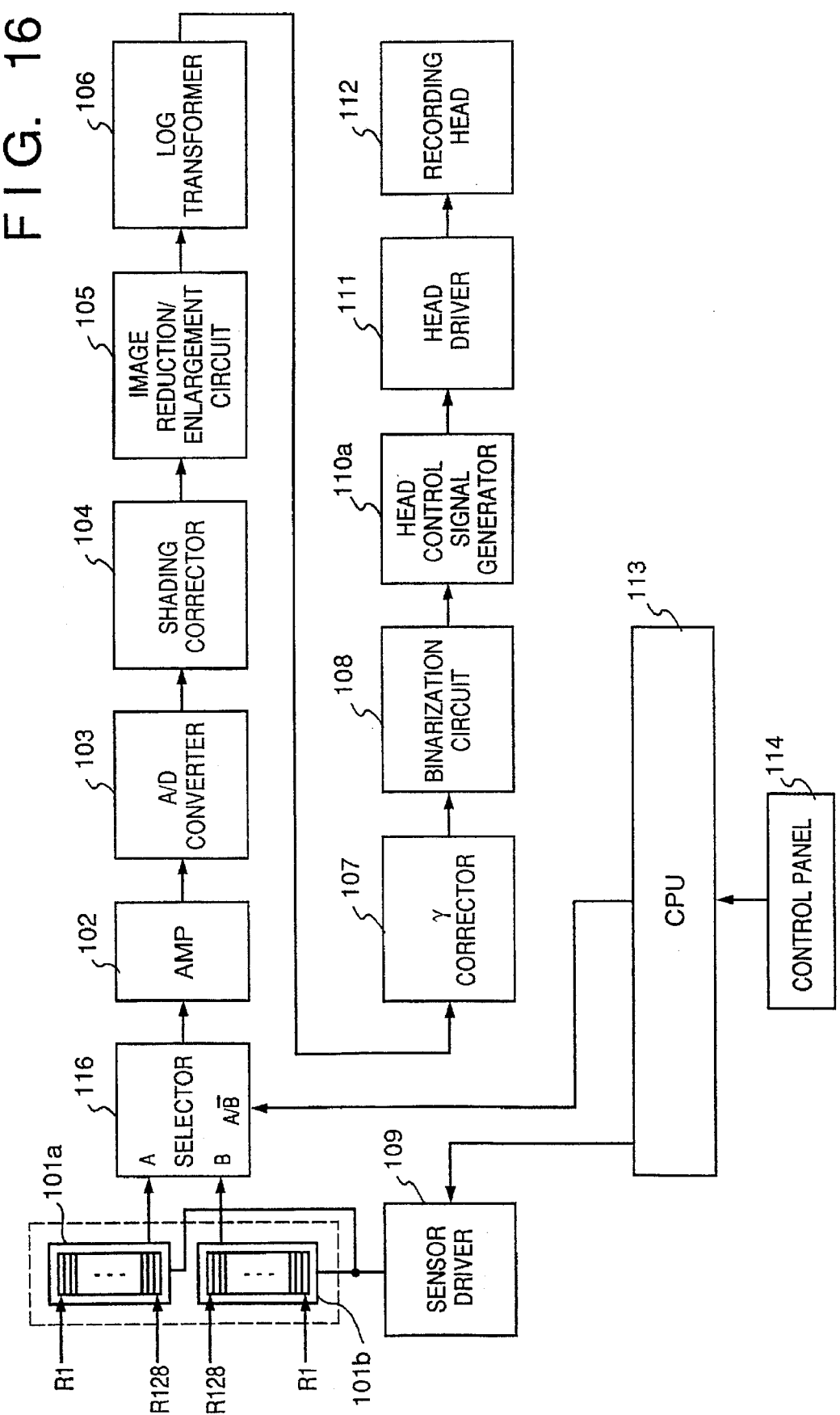
FIG. 16 is a block diagram showing the configuration of a color copying machine, with an image processing portion as a central portion, according to a second embodiment of the present invention.

FIG. 16 shows the configuration of a color copying machine according to the second embodiment. The difference from FIG. 1, showing the configuration of the copying machine according to the first embodiment, is that line sensors 101a and 101b are opposed to each other, and that selector 116 selects one of outputs from the line sensors 101a and 101b in accordance with a signal level of the forward/reverse signal 115.

Figure 19:
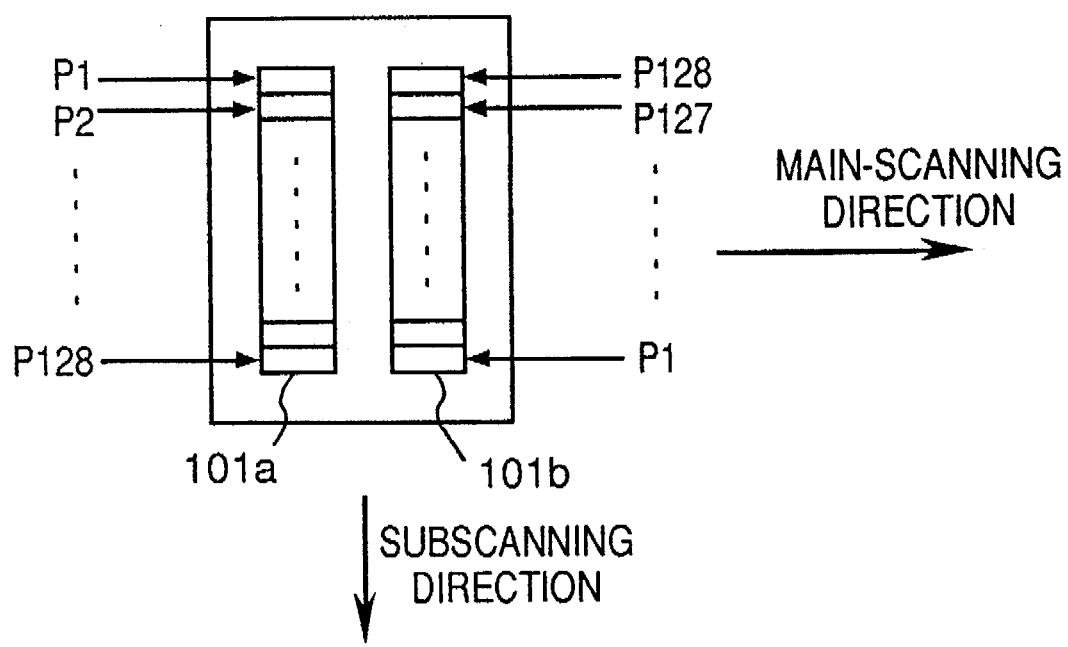
FIG. 19 illustrates the arrangement of sensor elements of line sensors according to the second embodiment.

FIG. 19 shows the construction of the line sensors 101a and 101b in the second embodiment.

Both line sensors 101a and 101b have 400 dpi resolution, and have sensor elements for one hundred and twenty-eight pixels aligned in the subscanning direction. The sensor 101a is used when an original image is read in the forward-main-scanning direction, and the sensor 101b is used when the original is read in the reverse-main-scanning direction. These two line sensors are always activated. The selector 116 selects one of the outputs signals from these sensors and outputs the signal into the amplifier 102, where the input signal is A/D converted. The subsequent processings are similar to those in the first embodiment.

Figure 17:
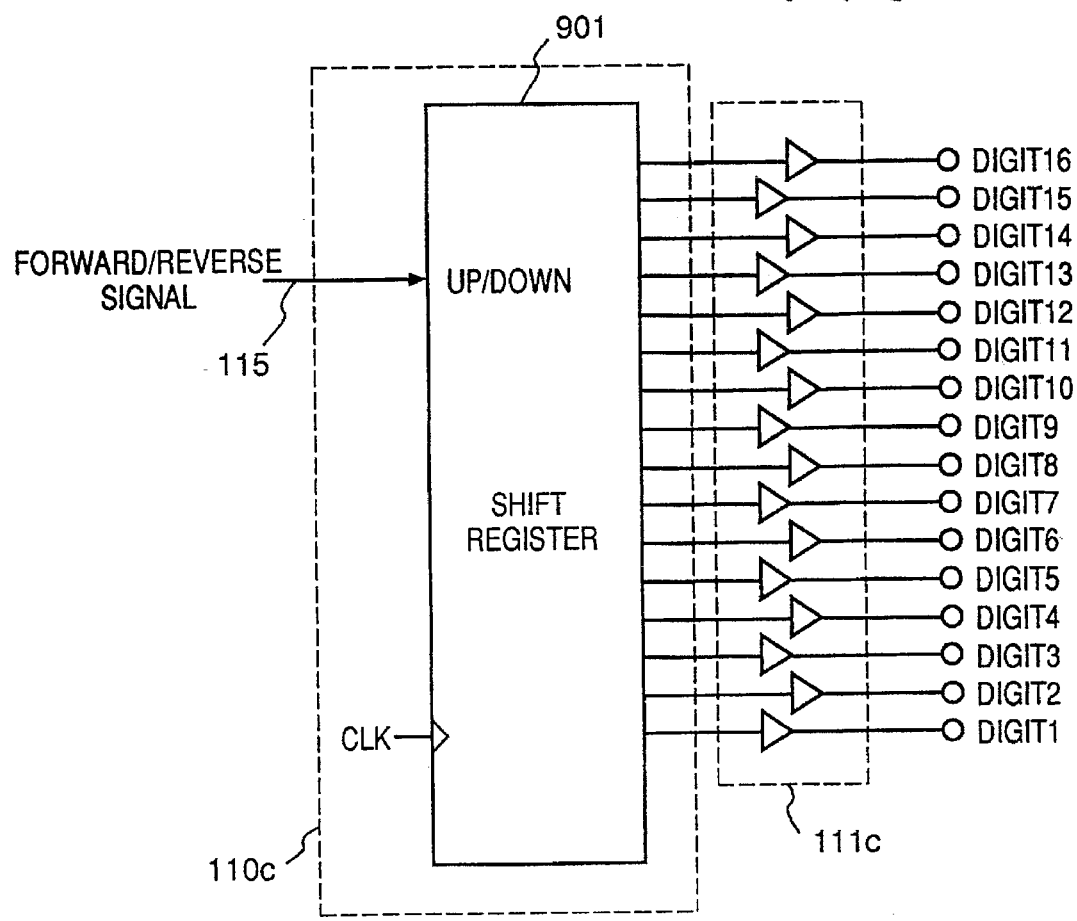
FIG. 17 illustrates a digit signal generator in a head control signal generator according to the second embodiment.
Figure 18:
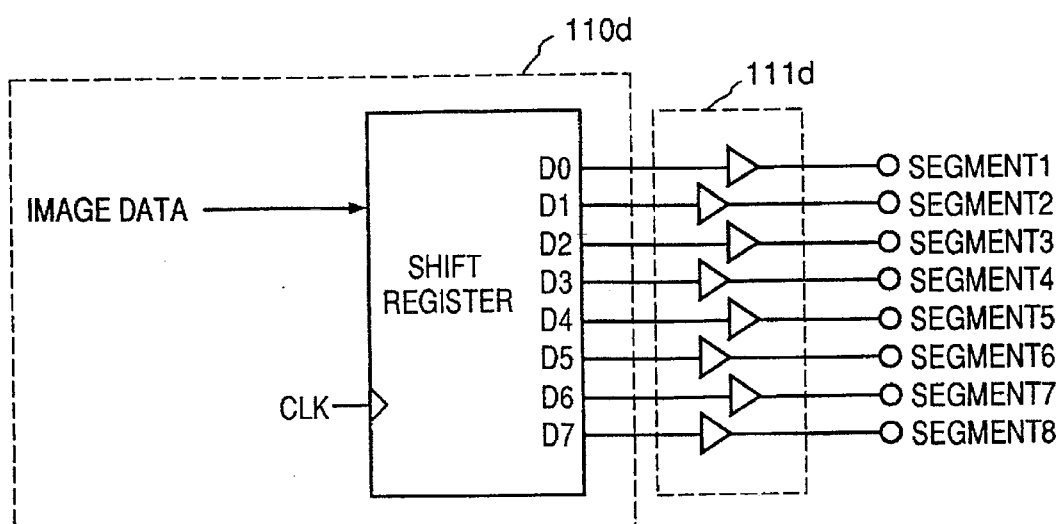
FIG. 18 illustrates a segment signal generator in the head control signal generator according to the second embodiment.

FIGS. 17 and 18 show the construction of the head control signal generator 110 and the head driver 111 in this embodiment. FIG. 17 shows circuits 110c and 111c, and FIG. 18 shows circuits 110d and 111d.

Figure 7:
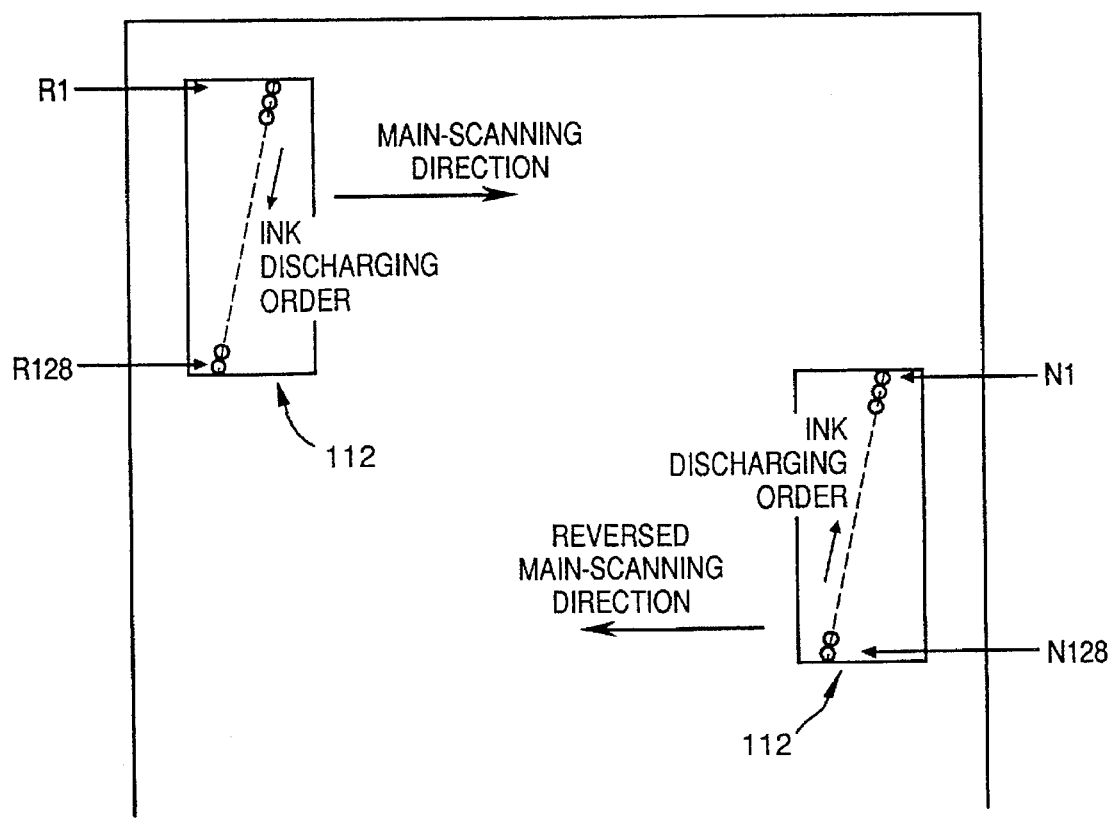
FIG. 7 illustrates an ink discharging order in forward-reverse scannings in a main-scanning direction in the color copying machine according to the first embodiment.

In a case where the line sensor 101a scans forward in the main-scanning direction for recording, similarly to FIGS. 9 and 10, the shift register 901 outputs the digit signals from DIGIT 1 to DIGIT 16, and the segment signals SEGMENT 1 to SEGMENT 8 are outputted corresponding to image data. In a case where the line sensors 101a and 101b reverse in the main-scanning direction, the line sensor 101b reads an original image in reversed bit-order. In this case, the shift register 901 outputs the digit signals from DIGIT 16 to DIGIT 1. The segment signals are outputted in correspondence with the order of read image data. As shown in FIG. 7, when the recording head 112 reverses in the main-scanning direction, the ink discharging order is N128→N1.

It should be noted that the processing by the controller 201 in this case is identical to that in the first embodiment, and therefore, the flowchart and the explanation of the processing will be omitted.

According to the second embodiment, the two line sensors 101a and 101b simplify the construction of head control signal generator 110a, thus enabling copying with a simple hardware construction.

Further, the same advantages can be achieved by changing the image outputting order from the line sensor 101. In this construction, when the line sensor 101 scans forward in the main-scanning direction, image signals are outputted in the order P1→P128, while when the line sensor 101 reverses in the main-scanning direction, image signals are outputted in the order P128→P1. In this manner, changing the image outputting order realizes the advantages of the second embodiment.

In the embodiments, the binarization circuit 108 performs binarization based on the dither method, however, the error diffusion method and the mean density conservation method can also be employed. As these methods binarize multi-level data by referring to a two-dimensional space, at least a plurality of memories for storing one-line data read by the line sensor 101 at one reading are necessary.

In this case, image data currently-being read by the line sensor 101a is data at most a few lines prior to a line currently-being recorded by the recording head. Accordingly, this is substantially the same as real-time-recording image data read by the line sensor 101a.

When the error diffusion method or the mean density preservation method is employed, as shown in FIG. 22, the number of pixels of a line image to be read by the line sensor 101 at one reading is desirably greater (by several dots) than the number of nozzles of the recording head. If the number of pixels read by the scanner at one reading equals the number of nozzles of the recording head, the binarization is performed within an independent reading band and is not performed depending upon the prior and the subsequent reading band. This is because the number of pixels is preferably greater than that of the nozzles. In this case, the line sensor 101 overlaps a read band by the excessive n dots at each reading.

The recording head may be driven in nozzle group units or in nozzle units. Further, in the embodiments, the nozzles are aligned in a line slanted with respect to the recording head, however, this does not pose any limitation upon the present invention. For example, the nozzles may be aligned in a line vertical to the recording head and the recording head may be slanted on the carriage.

In the embodiments, the same size copying is described and the scanning speed of the line sensor 101 and that of the recording head 112 are the same. However, the present invention is not limited to this arrangement.

For example, if the scanning speed of the recording head is the maximum to record a normal image and an original image data is enlarged to a doubled size, the scanning speed of the line sensor 101 can be lowered to ½. If the image data is reduced to ½, the scanning speed of the line sensor 101 can be raised to a doubled speed.

In any case, as described above, using the dither method can omit a memory for binarization. When the error diffusion method or the mean density conservation method is employed, only a buffer memory for storing a plurality of line data (for one hundred and twenty-eight pixels) read in one reading by the line sensor is required. Note that the distance of moving of the line sensor in the subscanning direction corresponds to the one-band recording width by the recording head. That is, if the output image size is doubled, the moving-distance of the line sensor in the subscanning direction is ½ of that of same size changing copying. The image reduction/enlargement circuit 105 performs interpolation upon sixty-four pixels of the input image data (one hundred and twenty-eight pixels) and generates data for one hundred and twenty-eight pixels. The principle of interpolation pixel generation is publicly-known, and therefore, the explanation of the principle will be omitted.

The present invention provides excellent effects when it is applied to a recording head of a recording device which forms flying droplets utilizing thermal energy With regard to a typical configuration and operating principle, it is preferred that the foregoing be achieved using the basic techniques disclosed in the specifications of U.S. Pat. Nos. 4,723,129 and 4,740,796. This scheme is applicable to both so-called on-demand-type and continuous-type apparatus. In particular, in the case of the on-demand type, at least one drive signal, which provides a sudden temperature rise that exceeds that for film boiling, is applied, in accordance with print information, to an electrothermal transducer arranged to correspond to a sheet or fluid passageway holding a fluid (ink). As a result, thermal energy is produced in the electrothermal transducer to bring about film boiling on the thermal working surface of the printing head. Accordingly, air bubbles can be formed in the fluid (ink) in one-to-one correspondence with the drive signals. A discharging port is made to discharge the fluid (ink) by growth and contraction of the air bubbles so as to form at least one droplet. If the drive signal has the form of a pulse, growth and contraction of the air bubbles can be made to take place rapidly and in appropriate fashion. This is preferred since it will be possible to achieve fluid (ink) discharging having excellent response.

Signals described in the specifications of U.S. Pat. Nos. 4,463,359 and 4,345,262 are suitable as drive pulses having this pulse shape. It should be noted that even better printing can be performed by employing the conditions described in the specification of U.S. Pat. No. 4,313,124, which discloses an invention relating to the rate of increase in the temperature of the above-mentioned thermal working surface. In addition to the combination of the discharging port, fluid passageway and electrothermal transducer (in which the fluid passageway is linear or right-angled) disclosed as the construction of the recording head in each of the above-mentioned specifications, the present invention covers also an arrangement using the art described in the specifications of U.S. Pat. No. 4,558,333 and 4,459,600, which disclose elements disposed in an area in which the thermal working portion is curved.

Further, it is permissible to adopt an arrangement based upon Japanese Patent Application Laid-Open No. 59-123670, which discloses a configuration having a common slot for the discharging portions of a plurality of electrothermal transducers, or Japanese Patent Application Laid-Open No. 59-138461, which discloses a configuration having openings made to correspond to the discharging portions, wherein the openings absorb pressure waves of thermal energy.

It is permissible to use a freely exchangeable tip-type printing head attached to the main body of the apparatus and capable of being electrically connected to the main body of the apparatus and capable of supplying ink from the main body, or a cartridge-type recording head in which an ink tank is integrally provided on the printing head itself.

The addition of recovery means for the printing head and spare auxiliary means provided as components of the printing apparatus of the invention is desirable since these stabilize the effects of the invention greatly. Specific examples of these means that can be mentioned are capping means for capping the printing head, cleaning means, pressurizing or suction means, and preheating means such as an electrothermal transducer or another heating element or a combination thereof. Implementing a preliminary discharging mode for performing discharging independently of recording also is effective in order to perform stabilized printing.

The printing mode of the printing apparatus is not limited merely to a printing mode for a mainstream color only, such as the color black. The printing head can have a unitary construction or a plurality of printing heads can be combined. The apparatus can be one having at least one recording mode for a plurality of different colors or for full-color recording using mixed colors.

Further, ink is described as being the fluid in the embodiments of the invention set forth above. The ink used may be one which solidifies at room temperature or lower, or one which softens or liquefies at room temperature. Alternatively, in an ink-jet arrangement, generally the ink is temperature-controlled by regulating the temperature of the ink itself within a temperature range of between 30° C. and 70° C. so that the viscosity of the ink will reside in a region that allows stable discharging of the ink. Therefore, it is permissible to use an ink liquefied when the printing signal is applied.

In order to positively prevent elevated temperature due to thermal energy when this is used as the energy for converting the ink from the solid state to the liquid state, or in order to prevent evaporation of the ink, it is permissible to use an ink which solidifies when left standing. In any case, the present invention is applicable also in a case where use is made of an ink which solidifies in response to application of thermal energy, such as an ink solidified by application of thermal energy conforming to a printing signal or ink which has already begun to solidify at the moment it reaches the recording medium. Such inks may be used in a form in which they oppose the electrothermal transducer in a state in which they are held as a liquid or solid in the recesses or through-holes of a porous sheet, as described in Japanese Patent Application Laid-Open Nos. 54-56847 and 60-71260. In the present invention, the most effective method of dealing with these inks is the above-described method of film boiling.

Furthermore, as to the form of the printing apparatus according to the present invention, use is not limited to an image output terminal of an image processing apparatus such as a word processor or computer described above. Other configurations, which may be provided as a separate or integral part, include a copying machine in combination with a reader or the like, a facsimile machine having a transmitting/receiving function, etc.

As described above, the present invention enables reciprocating scan-reading of an original image and reciprocating recording synchronized with the reading.

Further, the present invention achieves high-quality recording by scan-reading an original and reciprocating recording read image data by a recording head. In this case, the image reading and the recording are substantially simultaneous, and accordingly, copying is made at a high-speed and with a small memory capacity.

The present invention can be applied to a system constituted by a plurality of devices or to an apparatus comprising a single device. Furthermore, it goes without saying that the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. A recording apparatus using an image scanner including a plurality of reading elements and a recording head including a plurality of recording elements which are disposed in a line wherein the line is slanted at a predetermined angle with respect to a subscanning direction of the recording head, said recording apparatus comprising:

reading means for reciprocating the image scanner along a main-scanning direction and driving the image scanner to read an image when forward-scanning and when reverse-scanning;

signal generating means for generating a recording signal for the recording elements based on image data read by said reading means;

recording head moving means for reciprocating the recording head along the main-scanning direction so that forward/reverse of a moving direction of the recording head substantially corresponds to that of the image scanner; and driving means for driving the recording elements of the recording head being moved by said recording head moving means in accordance with the recording signal generated by said signal generating means, said driving means including driving order reverse means for reversing a driving order of the recording elements of the recording head, and means for, when a scanning direction of the recording head is changed from a forward direction to a reverse direction or vice versa, activating said driving order reverse means.

2. The recording apparatus according to claim 1, wherein a number of the reading elements of the images canner is equal to that of the recording elements of the recording head or greater than that of the recording elements by several dots.

3. The recording apparatus according to claim 1, further comprising means for, when one band scanning by the image scanner is completed, moving the image scanner in the subscanning direction by a distance corresponding to a width of a band image recorded by the one scanning by the recording head, and substantially at the same time, moving the recording head in the subscanning direction by the band image width.

4. The recording apparatus according to claim 1, wherein said signal generating means comprises conversion means for converting a luminance signal outputted from the image scanner into a density signal and binarization means for binarizing the density signal converted by said conversion means for pseudo half-tone image reproduction.

5. The recording apparatus according to claim 4, wherein said binarization means binarizes density data based on the dither method, and said binarization means comprises:

a look-up table for storing threshold values for constructing a dither matrix;

address updating means for updating an address to be provided to the look-up table at each input of density data for one pixel; and a comparator for comparing a threshold value generated from the look-up table under control of the address updating means with the density data for one pixel and generating a binary signal.

6. The recording apparatus according to claim 4, wherein said signal generation means comprises a buffer memory for storing line image data obtained by one scanning of the image scanner for several lines, and wherein said binarization means converts density data into binary data based on the error diffusion method or the mean density conservation method.

7. The recording apparatus according to claim 1, further comprising reduction/magnification rate setting means for setting a copying reduction/magnification rate, wherein said reading means includes adjustment means for adjusting a scanning speed of the image scanner in accordance with the copying reduction/magnification rate set by said reduction/magnification rate setting means.

8. The recording apparatus according to claim 7, wherein if the copying reduction/magnification rate is set to same size by said reduction/magnification rate setting means, the scanning speed of the image scanner and that of the recording head are substantially equal.

9. The recording apparatus according to claim 1, wherein each of the recording elements is an ink-jet nozzle for discharging an ink drop.

10. The recording apparatus according to claim 1, wherein the ink-jet nozzle comprises a thermal energy conversion element for generating thermal energy upon an ink.

11. The recording apparatus of claim 1, wherein said recording apparatus is a copying apparatus.

12. A recording method using a recording apparatus having an image scanner including a plurality of reading elements and a recording head including a plurality of recording elements, which are disposed in a line, wherein the line is slanted at a predetermined angle with respect to a subscanning direction of the recording head, said recording method comprising the steps of:

a reading step of reciprocating the image scanner along a main-scanning direction and driving the image scanner to read an image when forward-scanning and when reverse-scanning;

a signal generating step of generating a recording signal for the recording elements based on image data read by said reading step;

a recording head moving step of reciprocating the recording head along the main-scanning direction so that forward/reverse of a moving direction of the recording head substantially corresponds to that of the image scanner; and a driving step of driving the recording elements of the recording head being moved by said recording head moving step in accordance with the recording signal generated by said signal generating step, wherein said driving step including a step of reversing a driving order of the recording elements of the recording head, and a step of, when a scanning direction of the recording head is in any of a forward direction and a reverse direction, activating said driving order reverse step.

13. The method according to claim 12, wherein a number of the reading elements of the image scanner is equal to that of the recording elements of the recording head or greater than that of the recording elements by several dots.

14. The method according to claim 12, further comprising a step of, when one band scanning by the image scanner is completed, moving the image scanner in the subscanning direction by a distance corresponding to a width of a band image recorded by the one scanning by the image scanner, and substantially at the same time, moving the recording head in the subscanning direction by the band image width.

15. The method according to claim 12, wherein said signal generating step comprises a conversion step of converting a luminance signal outputted from the image scanner into a density signal and a binarization step of binarizing the density signal converted in said conversion step for pseudo half-tone image reproduction.

16. The method according to claim 15, wherein in said binarization step, density data is binarized based on the dither method, and said binarization step comprises:

an address updating step of, at each inputting of density data for one pixel, updating an address to be provided to a look-up table in which threshold values constructing a dither matrix are pre-stored; and a step of comparing a threshold value generated from the look-up table under control of said address updating step with the density data for one pixel and generating a binary signal.

17. The method according to claim 15, wherein in said binarization step, a pre-provided buffer for storing line image data obtained from one scanning by the image scanner for several lines is referred to and density data is binarized based on the error diffusion method or the mean density conservation method.

18. The method according to claim 12, further comprising a reduction/magnification rate setting step of setting a copying reduction/magnification rate, wherein said reading step includes a step of adjusting a scanning speed of the image scanner in accordance with the copying reduction/magnification rate set in said reduction/magnification rate setting step.

19. The method according to claim 18, wherein if the copying reduction/magnification rate is set to same size in said reduction/magnification rate setting step, the scanning speed of the image scanner and that of the recording head are substantially equal.

20. The method according to claim 12, wherein each of the recording elements is an ink-jet nozzle for discharging an ink drop.

21. The method according to claim 12, wherein the ink-jet nozzle comprises a thermal energy conversion element for generating thermal energy upon an ink.

* * * * *

UNITED STATES PATENT AND TRADEMARK OFFICE
CERTIFICATE OF CORRECTION

PATENT NO. : 5,629,771        Page 1 of 3
DATED : May 13, 1997
INVENTOR(S) : FUMIO MIKAMI It is certified that error appears in the above-indentified patent and that said Letters Patent is hereby corrected as shown below:

[57] Abstract

Line 9, "real-time converted" should read --converted in real-time--.

COLUMN 1:

Line 14, "by" should read --by a--.
Line 45, "a" should be deleted.

COLUMN 2:

Line 37, "bly" should read --blies--; and "where" should read --which--.

COLUMN 4:

Line 67, "While the" should read --The--.

UNITED STATES PATENT AND TRADEMARK OFFICE
CERTIFICATE OF CORRECTION

PATENT NO. : 5,629,771
DATED : May 13, 1997
INVENTOR(S) : FUMIO MIKAMI

It is certified that error appears in the above-indentified patent and that said Letters Patent is hereby corrected as shown below:

COLUMN 7:

Line 55, "ink" should read --the ink--.

COLUMN 9:

Line 35, "NSI;" should read --N81;--.

COLUMN 10:

Line 21, "S10," should read --S10,--.

COLUMN 11:

Line 60, "outputs" should read --output--.

UNITED STATES PATENT AND TRADEMARK OFFICE
CERTIFICATE OF CORRECTION

PATENT NO. : 5,629,771                  Page 3 of 3

DATED : May 13, 1997

INVENTOR(S) : FUMIO MIKAMI

It is certified that error appears in the above-indentified patent and that said Letters Patent is hereby corrected as shown below:

<u>COLUMN 12</u>:

Line 39, "currently-being" should read --currently being--.

<u>COLUMN 15</u>:

Line 47, "images canner" should read --images scanner--.

<u>COLUMN 16</u>:

Line 24, "to" should read --to the--.

<u>COLUMN 18</u>:

Line 15, "to" should read --to the--.

Signed and Sealed this

Twenty-fifth Day of November, 1997

Attest:

BRUCE LEHMAN

Attesting Officer          Commissioner of Patents and Trademarks